US012646283B2

(12) United States Patent
Croxford et al.

(10) Patent No.: US 12,646,283 B2
(45) Date of Patent: Jun. 2, 2026

(54) DATA PROCESSING SYSTEMS

(71) Applicant: Arm Limited, Cambridge (GB)

(72) Inventors: Daren Croxford, Swaffham Prior (GB); Roberto Lopez Mendez, Cambridge (GB); Mina Ivanova Dimova, Cambridge (GB)

(73) Assignee: ARM Limited, Cambridge (GB)

( * ) Notice: Subject to any disclaimer, the term of this patent is extended or adjusted under 35 U.S.C. 154(b) by 448 days.

(21) Appl. No.: 17/713,119

(22) Filed: Apr. 4, 2022

(65) Prior Publication Data

US 2023/0316694 A1     Oct. 5, 2023

(51) Int. Cl.
| | |
|---|---|
| *G06V 10/25* | (2022.01) |
| *G06N 3/045* | (2023.01) |
| *G06V 10/70* | (2022.01) |
| *G06V 10/82* | (2022.01) |

(52) U.S. Cl.
CPC ............. *G06V 10/25* (2022.01); *G06N 3/045* (2023.01); *G06V 10/82* (2022.01); *G06V 10/87* (2022.01)

(58) Field of Classification Search
CPC ......... G06T 1/007; G06T 3/40; G06T 3/4046; G06T 7/50; G06T 9/002; G06N 3/045; G06V 10/25; G06V 10/82; G06V 10/87
See application file for complete search history.

(56) References Cited

U.S. PATENT DOCUMENTS

| | | | | |
|---|---|---|---|---|
| 10,402,695 | B1 * | 9/2019 | Kim | G06N 3/09 |
| 11,854,159 | B2 * | 12/2023 | Kim | G06V 10/764 |
| 12,017,301 | B2 * | 6/2024 | Iyer | B23K 26/073 |
| 12,046,031 | B2 * | 7/2024 | Dimond, Jr. | G06V 20/41 |
| 12,175,703 | B2 * | 12/2024 | Birchfield | G06N 3/0464 |
| 2017/0372174 | A1 * | 12/2017 | Wshah | G06V 10/82 |
| 2018/0039853 | A1 * | 2/2018 | Liu | G06V 10/768 |
| 2018/0189613 | A1 * | 7/2018 | Wolf | G06V 40/161 |
| 2021/0150721 | A1 * | 5/2021 | Yohanandan | G06N 3/045 |
| 2021/0271847 | A1 * | 9/2021 | Courtiol | G06V 20/698 |
| 2023/0030247 | A1 * | 2/2023 | Sevostianov | H04N 13/117 |

* cited by examiner

*Primary Examiner* — Stephen R Koziol
*Assistant Examiner* — Dylan J Sherrillo
(74) *Attorney, Agent, or Firm* — Pearl Cohen Zedek Latzer Baratz LLP

(57) ABSTRACT

When processing regions of interest in frames in a data processing system that can execute a plurality of neural networks that are each configured to more optimally process a region of interest of a respective size, a region of interest is first identified within a frame, the size of the region of interest is determined, and one of the plurality of available neural networks is selected to use to process the region of interest based on the determined size. The region of interest is scaled to produce a scaled version of the region of interest, where the scaling is determined based on the selected neural network. The scaled version of the region of interest is then processed using the selected neural network.

20 Claims, 10 Drawing Sheets

DATA PROCESSING SYSTEMS

BACKGROUND

The technology described herein relates to data processing systems, and in particular to the processing of "regions of interest" in input data arrays, for example in image processing in data processing systems.

It can be desirable to identify and process particular regions of interest in an input frame (data array) for example representing an image or other set of data.

For example, image processing, such as image enhancement, image segmentation, object detection, and/or object identification, for use in applications such as hand tracking, gesture classification, background replacement, body pose estimation, 3D object recognition, character image improvement, optical character recognition, facial recognition, and motion tracking in augmented reality (AR) or virtual reality (VR) applications, such as when performing asynchronous spacewarp (as discussed in more detail below), may involve identifying potential regions of interest (e.g. for further processing) in an image (frame) being processed.

Once a region of interest has been identified, the identified region of interest may then be processed further, for example using object classification or image enhancement techniques. For example, a region of interest within an image that may represent, for example, an object (e.g. a ball or a house) that is depicted in the image could be identified, and then processed further to determine if and what object it is in the image, or for example to enhance that portion of the image appropriately.

A neural network may be used to further process an identified region of interest. For example, a neural network may be used to classify what is shown in a region of interest of an image (e.g. what object is depicted in the region of interest). Using neural networks may be resource-intensive, however. This may be particularly apparent in devices which have limited processing capability, memory and/or battery capacity, for example.

The Applicants believe that there remains scope for further improvements to identifying and processing regions of interest in input frames (e.g. images) in data processing systems, for example when performing image processing operations.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
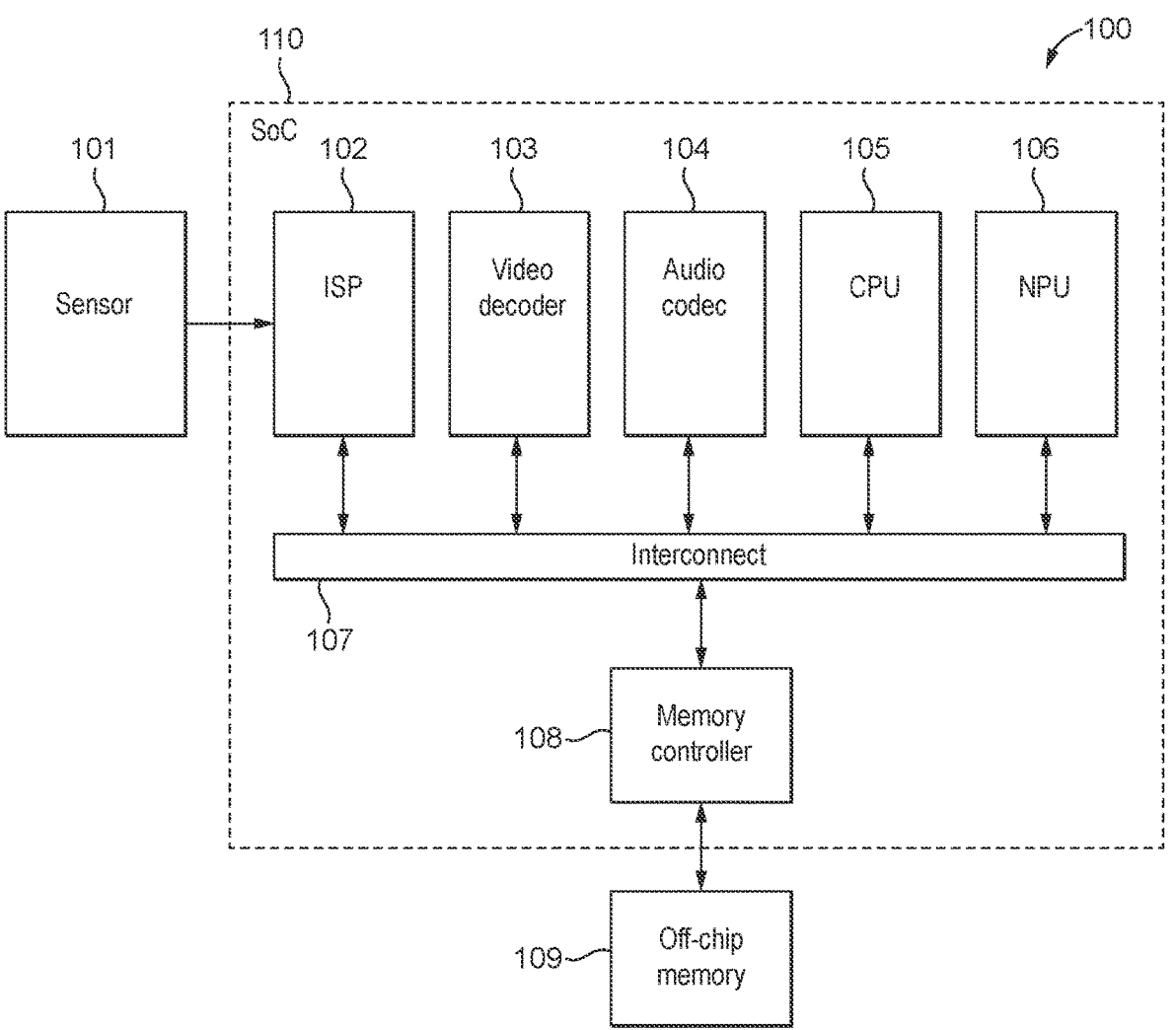
FIG. 1 shows schematically a data processing system which may be configured to perform neural network processing in accordance with embodiments of the technology described herein.

A first embodiment of the technology described herein comprises a method of operating a data processing system which can execute a plurality of neural networks, each neural network being operable to process regions of interest identified in a frame to be processed and each configured to more optimally process a region of interest of a respective size, the method comprising, for a frame to be processed:

identifying a region of interest within the frame;

determining a size of the region of interest;

selecting, based on the determined size, one of the plurality of neural networks to use to process the region of interest;

scaling the region of interest to produce a scaled version of the region of interest, the scaling determined based on the selected neural network; and processing the scaled version of the region of interest using the selected neural network.

A second embodiment of the technology described herein comprises a data processing system, the system comprising:

a processor or processors configured to execute a plurality of neural networks, each neural network operable to process regions of interest identified in a frame to be processed and each configured to more optimally process a region of interest of a respective size;

a region identifying circuit configured to identify a region of interest within a frame being processed;

a size determining circuit configured to determine a size of a region of interest identified in a frame being processed;

a neural network selecting circuit configured to select, based on the determined size of a region of interest, one of the plurality of neural networks to use to process the region of interest;

a scaling circuit configured to scale a region of interest to produce a scaled version of a region of interest, the scaling determined based on the neural network selected to use to process the region of interest; and a control circuit configured to cause a scaled version of a region of interest to be processed by a neural network selected for processing the scaled version of the region of interest by the neural network selecting circuit.

The technology described herein relates to the processing of regions of interest identified within a frame using one of a plurality of available neural networks, in which each neural network is configured to more optimally process a region of interest of a respective size. As will be discussed further below, processing the region(s) of interest may involve classifying an object depicted in the region(s) of interest. For example, the processing may involve determining what sort of object (e.g. a ball, a house, etc.) is depicted in the region of interest.

In the technology described herein, a frame (e.g. corresponding to an image) is first processed in order to identify at least one region of interest. The at least one region of interest may be identified, for example, by selecting a group of data (sampling) positions in the frame that share a similar property, such as position, colour, intensity, texture or depth. Once a region of interest has been identified, the size of the region of interest is determined. For example, the vertical and horizontal dimensions of the region of interest may be determined.

Based on the determined size, a neural network of the plurality of available neural networks is selected to process the identified region of interest. The region of interest is then scaled based on the selected neural network to form a scaled version of the region of interest. Scaling the region of interest may involve changing at least one dimension of the region of interest to form the scaled region. The scaled region is then processed by the selected neural network (for example, in order to classify an object depicted in the region of interest).

The Applicants have recognised in this regard that, e.g. objects (and thus regions of interest) to be, e.g. analysed in frames may have different sizes. For example, a first frame may show an object (e.g. a building) that is relatively far from the camera while a second frame may show an object (e.g. another building) that is relatively close to the camera. The building depicted in the first frame may take up a smaller proportion of the area of the frame, for example 10% of the area, whereas the building depicted in the second frame may take up, say, 90% of the area of the frame.

In another example, in a sequence of frames that show an object (e.g. a ball) moving towards the camera (or, more generally, the point of view of the observer), the object may initially take up a small proportion of the frame when it is further away from the camera and the proportion of the frame taken up by the object may increase in subsequent frames of the sequence as the object is shown moving towards the camera. Conversely, in a frame sequence in which an object moves away from the camera, the proportion of the frame taken up by the object may decrease from the initial frame through the subsequent frames.

While it would be possible to provide a neural network trained to perform image processing, for example to classify objects within an identified region of interest, or to enhance the image, regardless of the size of the region of interest within a frame, the Applicants have recognized that such neural networks may be relatively expensive (e.g. in terms of the processing resources that they require) and/or may have relatively limited accuracy for some or all possible sizes of regions of interest that may be input to the neural network.

The technology described herein instead provides and uses a plurality of neural networks operable to process regions of interest in frames, but with each neural network being configured to more optimally process a region of interest of a particular size. For example, a first neural network may be optimized to process inputs of a certain size (e.g. 64×64 data positions (e.g. pixels)) and a second neural network may be optimized to process inputs of a different size (e.g. 512×512 data positions (e.g. pixels)).

The Applicants have realized that by scaling identified regions of interest to a particular size, it is possible to reduce processing power requirements while still enjoying the benefits of improved (e.g. more accurate) image processing using a neural network that is optimized to process inputs of that particular size. By scaling the identified region of interest to fit one of the available neural networks, it is possible to process a region of interest using a more efficient neural network without needing to provide a separate neural network for each possible size of input. In addition, it is not necessary to resort to processing the region of interest using a neural network that is not optimized to process inputs of that size, which may result in less accurate and/or poorer quality outputs.

Owing to the scaling, the neural networks can also be designed to be simpler since they only need to be able to process inputs of a particular size (and not inputs of all sizes, for example). As a result, each neural network can be made smaller and requires fewer processing resources to execute. In addition, each neural network may be better tuned to its task and may provide more accurate results (outputs) than a more generic neural network.

The technology described herein can thus allow more optimized neural networks to be used for image processing in a less resource-intensive way than has been used up to now. The technology described herein may accordingly be particularly suited for use with devices that are more limited and/or having constrained processing resources, such as embedded, mobile and/or portable devices. For example, it may facilitate improved image processing using more optimized neural networks on a mobile device.

The technology described herein identifies (and then processes) a region of interest in a frame to be processed. The frame should, and in an embodiment does, comprise an array of data positions (sampling positions). The frame may be, and in an embodiment is, a two-dimensional array of data positions, but it can also be a three (or higher) dimensional array of data positions if desired.

The frame may comprise and represent any suitable set of data to be analysed. In an embodiment the frame is, and represents, an image (i.e. is a 2D array of sampling positions (pixels) corresponding to an image). Other arrangements would, of course, be possible.

In an embodiment, the image(s) to be processed have a resolution of 1920×1080 pixels. In an embodiment, the image(s) to be processed have a resolution of 3840×2160 pixels. In an embodiment, the image(s) to be processed have a resolution of 4290×2800 pixels.

The technology described herein identifies a region or regions of interest in frames (e.g. images) being processed. A region of interest will comprise an appropriate region that is (in an embodiment) some but not all of the input frame (array), and thus may comprise an appropriate area/volume (part) of the input frame (and accordingly an appropriate group of the data (sampling) positions in the input frame). The region of interest may, for example, be intended to include (correspond to) an object depicted in the frame (image).

A region of interest within a frame may be identified in any suitable and desired manner. Where the frame is an image, a region of interest may be identified, e.g., using any appropriate method of image segmentation.

In an embodiment, a region of interest is identified where there is a group of (data) positions (e.g. pixels) in the frame that share a similar property or properties, such as position, colour, intensity, texture and/or depth.

Thus, in an embodiment, identifying a region of interest within a frame comprises identifying a region of data positions in the frame that have the same or similar values for a particular property or properties (and selecting a region of interest to be processed further based on (and, in an embodiment, to (at least) include) the region of data positions sharing similar property values). The determining of a region of data positions sharing similar property values may be performed using a neural network, or in any other suitable and desired manner.

Thus, in order to identify a potential region of interest, data relating to individual data positions (e.g. pixels) may be compared and a group of data positions sharing similar values for a particular attribute or attributes may be identified as a region of interest. The comparison may, for example, be between data associated with respective positions in the frame and/or it may be between data associated with individual data positions and a threshold value (that may be retrieved from memory, for example).

Alternatively or in addition, a region of interest may be identified based on contours extracted from the frame. For example, a region bounded by a particular contour may be identified as a region of interest. Alternatively or in addition, a region of interest may be identified based on changes between data values for a particular attribute or attributes between (e.g. adjacent) data positions in the frame. For example, a change in the value of a particular attribute or attributes above a given threshold (margin) may be taken as identifying an edge or boundary of a region of interest.

In an embodiment, a region of interest within a frame, at least in the case of image processing, is identified based on and using depth information associated with data positions in the frame (image). In an embodiment a group (region) of data positions (e.g. a set of adjacent pixels) having the same or similar depths is identified, and a region of interest within a frame to be processed further is selected based on (and, in an embodiment, to (at least) include) the group (region) of data positions (e.g. set of adjacent pixels) having the same or similar depths.

In this case, data positions having associated depths (depth values) that are all within a particular, in an embodiment selected, and in an embodiment predetermined, threshold of each other are, in an embodiment, identified and selected as forming a region of interest to be processed further (i.e. such that all the data positions in the identified and selected region of interest will fall within a particular range of depth values).

In this case, for example, a region of interest could be formed on the basis of data positions that all have (exactly) the same depth value, or data positions having depth values that are all within a particular threshold of each other could be identified and selected as a region of interest to be processed further. For example, the depth value of a particular data position or group of data positions within the frame could be identified, and then any adjacent data positions (e.g. pixels) having depth values within a particular threshold (margin) of that depth value included within the region of interest (and correspondingly, a depth value difference between adjacent data positions greater than a particular, in an embodiment selected, in an embodiment predetermined, threshold (margin), could be used as indicative of the edge (boundary) of a region of interest).

The Applicants have recognised in this regard that data positions (e.g. pixels) corresponding to the same object depicted in an image, for example, are likely to have the same or similar depth values. Thus, determining and identifying regions of interest to be processed further based on depth values associated with data positions in an image is likely to identify data positions (pixels) that are part of a same object depicted in the image. This may then facilitate identifying regions of interest within a frame (image) for further processing, as compared to, for example, using other techniques, such as boundary or edge detection.

In this case a region of interest may be identified solely using depth information for the data positions, or depth information may be used in combination with other properties and techniques, such as boundary or edge detection, if desired.

The Applicants have further recognised in this regard that depth information may be used to distinguish between "overlapping" objects (for example, when an object depicted in an image (frame) obscures part of another object).

Thus, in an embodiment, depth information is used to distinguish between two objects depicted in a frame when one of the objects obscures (overlaps) part of the other object.

In particular, the depth information can be used to distinguish the two objects so that they can be extracted separately from the frame and processed as individual and separate regions of interest (and in one embodiment, this is what is done).

Alternatively, a region of the frame depicting two overlapping objects may be processed as a single (common) region of interest (i.e. with the obscured object and the obscuring object being extracted and identified together as a single region of interest for processing).

The depth information associated with data positions in a frame (e.g. image) being processed can be provided (and if necessary generated) in any suitable and desired manner. For example, it may simply be read from memory as part of the data that is already stored for and associated with the frame (e.g. image) in question. The depth information may, for example, be generated as part of and when rendering a frame (image), or may be from a depth sensor, such as a LIDAR sensor, structured light, Time of Flight (ToF), disparity from stereo image sensors, or mono-depth neural network.

Additionally or alternatively, depth information from another frame, such as a previous frame, may be used in connection with and for identifying regions of interest in a (later) frame, if desired and where appropriate. For example, if a frame is identical or similar to a previously processed frame, the depth information associated with the earlier frame may also be used in connection with the later frame.

The region of interest that is identified (e.g. based on identifying a group of data positions having similar, e.g. depth values) could comprise, for example, simply the identified group of data positions in its "raw" form (for example corresponding substantially to the outline of an object depicted in an image that the region of interest is expected to correspond to).

However, in an embodiment, the identified region of interest for a which a size of the region of interest is then determined (and which is subsequently processed) is configured to have a regular shape, such as a polygonal shape. In an embodiment, the region of interest for which the size is determined (and which is then subsequently processed), is rectangular, and in an embodiment square, in shape. By providing a square or rectangular region of interest to be processed (instead of one having an irregular shape, for example), processing may be simplified and/or made more efficient.

In this case, the region of interest may not correspond exactly to the identified group of data positions in the frame (e.g. corresponding to the object depicted in the image that the region of interest is intended to correspond to), but may, for example, and in an embodiment, include both that particular group of data positions (the (potential) "object") and surrounding parts of the frame (image), e.g. so as to form a rectangular or square region of interest for further processing (that will include both the identified data positions sharing the common property (for example) (and, e.g., corresponding to the object of interest) and one or more further data positions, e.g. surrounding the group of data positions that share the common property). (Thus, the outline of the identified region of interest may be different from the object depicted in a frame).

The provision of regular shaped, rectangular or square, region of interest, can be achieved in any suitable and desired manner. For example, an appropriately shaped (e.g. rectangular or square) region of interest could be identified in the frame itself, based on identifying particular groups of data positions that are of interest (e.g. based on depth information), and then selecting an appropriately shaped region of interest from the input frame on that basis.

Thus, in one embodiment, identifying a region of interest within a frame to be processed comprises first identifying a group of data positions within the frame to be processed further (e.g. based on a particular property or properties, such as depth values, for the group of data positions), and then identifying a region of interest to be processed further based on that identified group of data positions, such as, and in an embodiment, corresponding to a region of interest of a particular, in an embodiment selected, and in an embodiment predetermined, shape (configuration), such as, and in an embodiment, rectangular and in an embodiment square, that includes the identified group of data positions.

For example, a region of interest may be identified as a rectangle with dimensions corresponding to the widest extent of the object depicted in the frame. If the object depicted in the frame is a ball (e.g. having a substantially circular shape in the frame), the identified region of interest may take the form of a square having sides equal to the diameter of the circular shape of the ball in the frame.

Alternatively, rather than extracting from the original frame a region of data positions of the desired shape (configuration), e.g. based on the identification of a group of data positions potentially corresponding to an object of interest, it would be possible to take only the group of data positions identified as being of potential interest from the input frame, and instead "pad" that group of pixels with dummy data positions (e.g. having a value of zero) to provide the desired "region of interest" shape for further processing. By removing data that is unlikely to be of interest (as it is in the background), by for example padding with a dummy data value (e.g. a value of zero), it may be possible to reduce the amount of processing for the portion that is of less interest. In addition, by providing dummy values of zero, the padded region of interest may take up less memory space when compressed and stored. As a result, less energy and/or bandwidth may be required in order to retrieve the stored region of interest from memory.

Once a region of interest has been identified, the size of the region of interest is determined. It is in an embodiment the size of the region of interest having the desired shape (configuration) that is determined, such as the size of the region of interest after any padding with dummy values to achieve a particular configuration of the region of interest for further processing.

The size of a region of interest can be determined in any suitable and desired manner, and using any suitable and desired measure of the "size". For example, the largest dimension of the region of interest could be determined (and in one embodiment that is the case).

In an embodiment, the extent of the region of interest in two (or three, as appropriate) orthogonal directions is determined. In an embodiment, the height and width (and, e.g., depth) of the region of interest is determined. In an embodiment, the dimension(s), e.g. the height and width, of the region of interest are expressed as a number of data positions (e.g. pixels) in a respective direction.

If the size of an image sensor and a (type of) lens used to take an image is known, together with depth information for the image, then it may be possible to correlate the size of a pixel with a physical size and thereby determine the physical size of an object depicted in the image. In an embodiment, a physical size of an object depicted in an image is determined based on the size of an image sensor used to take the image, a (type of) lens used to take the image and depth information associated with the image. The thus determined physical size of the object may be, and in an embodiment is, provided to a neural network that is selected to process a region of interest extracted from the image. Selection of the neural network is described in more detail below. The neural network may be, and in an embodiment is, trained using data relating to physical sizes of objects, as described further below.

Once the size of the identified region of interest has been determined, a neural network of a plurality of available neural networks is selected based on the determined size.

In this regard, the data processing system/data processor supports the execution of a set of plural neural networks that are operable to process regions of interest identified in a frame, with each (supported) such neural network being configured to more optimally process a region of interest of a respective (and different) size. The neural networks should be, and are in an embodiment, in particular configured to more optimally process inputs of a particular size. In an embodiment, each neural network of the set of plural neural networks has a different network architecture. In an embodiment, each neural network of the set of plural neural networks is trained using data that is relevant to that particular neural network (e.g., and in an embodiment, using inputs (images) of the size for which the neural network is intended to be optimized).

In an embodiment, a limited set of optimized neural networks, each optimized to process regions of interest of a different size, is provided. In an embodiment, three "size" optimised neural networks are provided. In an embodiment, the three neural networks are optimized for regions of interest of sizes 16×16, 64×64 and 512×512, data positions respectively.

In an embodiment, the set of plural neural networks includes eight neural networks that are respectively optimized for regions of interest of sizes 16×16, 32×32, 64×64, 128×128, 256×256, 512×512, 1024×1024, and 2048×2048. It will of course be appreciated that the neural networks may be optimized for other sizes of regions of interest, depending upon the circumstances. For example, the neural networks may be optimized for regions of interest of size 4×4, 50×50, etc. In an embodiment, the neural networks are alternatively or in addition optimized to process regions of interest that are not square. For example, the neural networks may be optimized to process rectangular, oblique or irregularly shaped regions of interest that may have maximum dimensions of 512×256, 512×32, 512×16, 64×32, 64×16, 16×8 and/or 16×4 data positions.

It will be appreciated in this regard, that each neural network of the set of neural networks that can be executed and that are supported in the data processing system for processing regions of interest should be, and is in an embodiment, configured for more optimal processing of (to more optimally process) regions of interest of a particular size (and that is of a different size to the other neural networks that are available (in the set of available neural networks)).

In this regard, a neural network being able to more optimally process a region of interest of a given size refers, for example, and in an embodiment, to the neural network being configured to accept and process inputs of the particular size that the neural network is more optimally configured for, and/or being more efficient at processing inputs of that particular size (as compared to inputs of other sizes).

The neural networks may be configured to be able to more optimally process regions of interest of respective different sizes in any suitable and desired manner. For example, the layers of the neural networks may be configured for processing regions of interest of a particular size, for example such that a neural network that is configured to process regions of interest to a larger size will, for example, include more layers than a neural network that is configured to process regions of interest of a smaller size.

Each neural network of the set of plural available neural networks is in an embodiment operable to perform the same type of processing on a region of interest (e.g., and in an embodiment, to classify an object that may be depicted in the region of interest), but will be configured to perform that processing more optimally for a particular region of interest size (input size).

As well as the neural networks that are configured to more optimally process regions of interest of a particular size, the system and processor could also support and be able to execute a more general neural network that is able to perform the same or similar neural network processing but which is not configured to operate with or be more optimal for regions of interest (inputs) of any particular size. This "general" neural network may then be used, for example, for regions of interest that may not correspond sufficiently to one of the "size" optimized neural networks, and/or in circumstances where the more optimised "size" based processing is not required or desired. Thus, this "general" neural network may be used for "default" processing of regions of interest when desired (albeit potentially at a greater resource cost and/or providing lower accuracy).

A "general" neural network may be trained using input data having a wide range of sizes such that it is able to process regions of interest of all sizes (without being optimized for any particular size). For example, the "general" neural network may be, and is in an embodiment, trained using training image data having sizes ranging from, e.g., 4×4 pixels to 3840×2160 pixels.

In contrast, a neural network that is optimized for a particular input size may be trained using input images (input data) having a much narrower range of sizes. For example, a neural network that is optimized to process images of size 50×50 pixels may have been trained using images in the size range from 45×45 to 55×55 pixels.

As mentioned above, a neural network may be, and in an embodiment is, trained using data relating to physical sizes of objects. Physical size data may be, and in an embodiment is, provided to a neural network as part of the input (meta) data. This is done, for example, in the event that computer vision using only image information is used. In an embodiment, a neural network is trained using depth information and images taken using a same image sensor and same lens. In this case, the neural network processing may, and in an embodiment does, calculate the physical size data from the provided depth information and image data such that the physical size data may be omitted from the input (meta) data. In an embodiment, a neural network is trained using depth information and scaled input (image) data. In this case, a scaling factor indicating the amount of scaling (either upscaling or downscaling) is provided to the neural network processing. For example, if the image has been downscaled by 50%, information indicating this amount of downscaling provided to the neural network.

It will be appreciated that training and performing inference on a size-optimized neural network may be quicker and/or simpler than training a general neural network since only a subset of the sizes of training images used to train the general neural network is required to train each size-optimized neural network.

A neural network of the plurality of available neural networks may be selected to use for processing a region of interest based on the determined size of a region of interest in any suitable and desired manner.

The selection of a neural network from the plurality of neural networks should be, and is in an embodiment, such that regions of interest of a certain size (or a certain range of sizes) are (in an embodiment) processed using a neural network that has been optimized for (is more optimal for) inputs of that (or similar to that) size. For example, the plurality of neural networks may comprise a first neural network that has been optimized for processing inputs of size 16×16 data positions, a second neural network that has been optimized for processing inputs of size 64×64 data positions and a third neural network that has been optimized for processing inputs of size 512×512 data positions. If the identified region of interest has a size of 72×72 data positions, then the second neural network may be selected as this has been optimized for inputs that are closest in size to the identified region of interest.

In one embodiment, the neural network that is optimised for regions of interest (inputs) that are closest in size to the determined size of the identified region of interest is selected to be used for processing the region of interest.

In another embodiment, the neural network that is optimised for the closest smaller size of region of interest (input) to the determined size of the region of interest to be processed is selected.

In another embodiment, the neural network that is optimised for the closest larger size region of interest (input) to the determined size of the region of interest is selected for processing the region of interest using the selection method described above.

In an embodiment, the neural network that is optimized for the closest smaller size of region of interest (input) to the determined size of the region of interest to be processed is selected where possible, with the neural network that is optimized for the closest larger size region of interest (input) to the determined size of the region of interest being selected where there is not a neural network that is optimized for processing a smaller size region of interest (input) to the determined size of the region of interest to be processed. Thus, in this case, regions of interest that are larger than the smallest size that an available neural network is optimized for will be processed using a respective neural network that is optimized for the closest smaller size of region of interest (input) to the determined size of the region of interest to be processed, but regions of interest that are smaller than the smallest size for which a neural network is optimized will be processed using the "smallest size" neural network.

In an embodiment, the dimension(s) of the region of interest are compared to one or more size thresholds and/or ranges to select a neural network based on the size of the region of interest. For example, the dimension(s) of a region of interest could be compared to a threshold and if the threshold is met or exceeded, a first neural network is selected, while if the threshold is not met, a second neural network is selected. In an embodiment, if more than two neural networks are available, more than one threshold is used in order to determine which neural network should be selected. In an embodiment, a given neural network is associated with a given range of size values and is selected when the size of an identified region of interest falls within the given range.

As well as using the size of the region of interest to select a neural network to be used to process the region of interest, it would be possible to also or instead use other condition(s) or criteria for selecting the neural network to use.

In an embodiment, a measure of the "complexity" of the region of interest (e.g., of the object potentially depicted in the region of interest) is used for the neural network selection. In this case, regions of interest that are determined to be more "complex" (to include a "complex" object) are in an embodiment processed using neural networks in one manner, with non-complex regions of interest being processed using neural networks in another, different, manner. For example, non-complex regions of interest could all be processed using the neural network that is optimized for the smallest size region of interest, with "complex" regions of interest having a neural network selection based on the size of the complex region of interest being made for them. Alternatively, complex regions of interest could be processed using a more general neural network (as discussed above), but with non-complex objects being processed using the appropriate size-optimized neural network. Other arrangements would, of course, be possible.

The determination of whether a region of interest (an object depicted in a region of interest) is complex or not can be made in any suitable and desired manner, and based on any suitable and desired criteria. For example, square objects (square groups of data positions having the desired similar properties) could be considered to be non-complex, and non-square objects could be considered to be complex. Additionally, or alternatively, where there are, as discussed above, multiple overlapping objects obscuring each other that have been extracted as a single region of interest, that could be determined as being a complex region of interest, whereas regions of interest containing only a single potential "object" could be considered to be non-complex. In an embodiment, the determination of whether an object is a complex object includes analysing the depth information associated with the region of interest depicting the object. For example, in the event of multiple overlapping objects, the obscuring object(s) would be expected to have different depth information from the obscured object(s) (i.e. indicating that the obscuring object(s) is or are not as "deep" in the frame as the obscured object(s)).

It would also be possible, for example, to consider the outline of the object that is potentially depicted in a region of interest (for example using depth or other information), and then based on the so-identified shape of the (potential) object, determine whether the object is to be treated as complex or non-complex (e.g. with shapes that are simple polygons or close to simple polygons being considered to be non-complex, but shapes that are not simple polygons or close to simple polygons being considered to be complex).

Once the neural network to be used has been selected based on the size of the region of interest, the region of interest is scaled based on the selected neural network.

The scaling of the region of interest (to produce a scaled version of the region of interest) should be, and is in an embodiment, so as to adjust (change) the size of the region of interest, and in an embodiment so as to adjust the size of the region of interest such that it (in an embodiment exactly) matches the particular (input) region of interest size that the selected neural network is configured to more optimally process. Thus, for example, in the example given above, where the identified region of interest has a size of 72×72 data positions, and the second neural network that has been optimised for processing inputs of size 64×64 data positions is selected for processing the region of interest, then the scaling of the region of interest based on the selected neural network should be, and is in an embodiment, so as to scale the region of interest from a size of 72×72 data positions to a size of 64×64 data positions.

By downscaling the region of interest, there is less image data to be processed (e.g. by the neural network). In addition, a smaller region of interest will (likely) take up less memory space when compressed and stored. Retrieval is also facilitated since memory access (bandwidth) and processing requirements can be reduced for a smaller region of interest.

Scaling a region of interest in an embodiment comprises making one or more dimensions (e.g. height and/or width) of the region of interest larger or smaller, and in an embodiment so as to (in an embodiment exactly) match the corresponding dimension(s) for the preferred input to the selected neural network. Increasing the size of one or more dimensions of a region of interest may be referred to as "scaling up" or "upscaling" while decreasing the size of one or more dimensions of a region of interest may be referred to as "scaling down" or "downscaling". The scaling may be performed in any suitable and desired manner, in an embodiment by applying a scaling factor as a percentage, a ratio, a fraction or a numeral. The scaling may be performed using hardware or software, or a combination of the two.

The scaling in an embodiment maintains the embodiment ratio of the region of interest, although in other embodiments the scaling may alter the embodiment ratio of the region of interest (e.g. where the embodiment ratio of the region of interest does not match the embodiment ratio of the input size for the selected neural network).

The scaling in an embodiment also comprises appropriately processing the region of interest, such as performing up-sampling and/or downsampling, and/or filtering, to provide an appropriate set of data values for the data positions in the scaled version of the region of interest.

In an embodiment, the scaling involves interpolation, such as one or more of: nearest-neighbour interpolation, bilinear interpolation, bicubic interpolation, Fourier-based interpolation, and edge-directed interpolation. In an embodiment, scaling involves using one or more deep convolutional neural networks.

(The Applicants have further recognised in this regard that it could be possible to identify a region of interest for processing that is already of the desired input size for one of the available neural networks. In that case, the scaling process can be, and is in an embodiment, omitted, and the identified region of input of interest simply input to the appropriate neural network without first scaling it.)

In one embodiment, scaling a region of interest (also) includes changing (e.g. transforming) the shape (configuration) of the region of interest. For example, a rectangular region of interest could be made square. A benefit of altering the shape of a region of interest, e.g. to make it square, is that it may be possible to improve efficiency since neural networks may perform better with (and are often more efficient when processing) a square input, for example.

In an embodiment, the shape (configuration) of a region of interest is changed, where necessary, by padding the region of interest with "dummy" data positions (that is, rather than taking the actual values from the data positions surrounding the region of interest within the frame, dummy values are instead used to fill data positions around the region of interest in order to form a, e.g. square region of interest). For example, an irregularly shaped region of interest could be "padded" to make the region of interest rectangular or square (and a rectangular region of interest could be "padded" in order to make the region of interest square). The dummy data positions that are used to pad the region of interest can be set to any appropriate "dummy" (default) value, such as, and in an embodiment, zero.

Any such padding could be done to the region of interest prior to the region of interest being scaled, but in an embodiment, a region of interest is padded (when that is done) after being scaled (with the scaling then in an embodiment maintaining the embodiment ratio of the original region of interest).

Additionally or alternatively, an appropriate transformation could be applied to the region of interest (as part of the scaling process) to change (transform) the shape (configuration) of the region of interest. Any suitable and desired transformation can be applied to the region of interest and used for this process.

At least in this case, an indication of the change of shape (e.g. transformation) that was performed to obtain the altered shape is in an embodiment provided to, and used by, the neural network processing.

Once the scaled version of a region of interest has been generated, then that scaled version of the region of interest can be, and is in an embodiment, processed by and using the selected neural network. This neural network processing of the (scaled) region of interest can be any suitable and desired neural network processing that may be performed for a region of interest identified in an input frame (e.g. identified in an image).

In an embodiment, the selected neural network applies an image enhancement technique to the scaled version of a region of interest. For example, the selected neural network may apply noise reduction techniques, histogram equalisation, lens correction, etc. In an embodiment, the selected neural network processes the scaled version of a region of interest to (try to) classify an object depicted in the scaled version of the region of interest (and, hence, in the region of interest identified in the frame).

Although the technology described herein has been described above primarily with reference to the processing of a single region of interest in a single frame, as will be appreciated by those skilled in the art, the technology described herein can be, and is in an embodiment, applied to and used for plural regions of interest (e.g. where plural (potential) regions of interest are identified in the same frame), and also for identifying regions of interest in plural different frames (e.g. where there is a sequence of frames (e.g. images) which it is desired to analyse). For any given region of interest in any given frame (e.g. image), the region of interest and frame is in an embodiment analysed and processed in the manner discussed above.

Thus, in an embodiment, a plurality of regions of interest can be, and is in an embodiment, identified for processing. The plurality of regions of interest may be identified in a single frame or they may be identified across a plurality of frames, e.g. forming a sequence of frames.

In an embodiment, successive frames of a sequence of frames are processed in the manner of the technology described herein. In some embodiments, some (but not all) frames of a sequence of frames are processed in the manner of the technology described herein. For example, alternate frames could be processed. In one embodiment, all of the frames of a sequence of frames are processed in manner of the technology described herein.

In an embodiment, when processing plural frames of a sequence of frames in the manner of the technology described herein, the process of identifying regions of interest to be processed further in the frames comprises comparing different frames in the sequence of frames, in an embodiment to identify differences between different frames in the sequence of frames, and then using the comparison (and in an embodiment any differences identified as a result of the comparison), to identify regions of interest for further processing.

The Applicants have recognised in this regard that in particular when a sequence of frames includes one or more moving objects (that is, when the position of a given object will change between frames in a sequence of frames), the presence of a moving object may be identified by comparing frames in the sequence of frames, thereby helping to facilitate identifying moving objects in the frames (and thus potential regions of interest to be analysed).

In one embodiment, this is used to identify potential regions of interest in a current frame (based on changes (e.g. movement) from a previous frame).

In an embodiment, it is also or instead used to identify regions to be searched (analysed) for a region of interest in a frame. For example, and in an embodiment, motion of a potential object (region of interest) in a sequence of frames may be predicted from an analysis of frames of the sequence of frames, with that motion then being extrapolated to future frames, and used to identify regions of future frames to be (in an embodiment) searched for identifying regions of interest to be analysed (on the assumption that that is the likely location in the frame of the moving object, for example).

This may allow the amount of processing required in order to identify a region of interest in a frame to be reduced, since, by using data obtained from earlier frames to predict the motion of an object depicted in the sequence of frames, it may be possible to limit or concentrate the processing of future frames to identify a region of interest to an area in which the object is expected to be based on the extrapolated motion (and thus analyse a smaller area of the frame in order to identify the region of interest in that frame).

Thus, in an embodiment, the identification of a region of interest in a frame of a sequence of frames comprises using data obtained from earlier frames in the sequence of frames to predict the motion of an object depicted in the sequence of frames, and using the predicted motion of the object depicted in the sequence of frames when identifying, and to identify, a region of interest in a frame of the sequence of frames (e.g., and in an embodiment, by analysing a smaller area of a frame for the purposes of identifying a region of interest in the frame based on the predicted object motion).

Other arrangements would, of course, be possible.

In the case where a plurality of regions of interest is identified for processing, then each identified region of interest could be processed individually in the manner of the technology described herein and independently of the other identified regions of interest, e.g. in turn. In this case, a first region of interest may be identified, the size of that region of interest determined and a neural network selected based on the determined size, with the first region of interest then being scaled and processed using the selected neural network, before a second region of interest is identified and processed, and so on.

However, in an embodiment, rather than simply identifying and processing each identified region of interest in turn, where there are plural regions of interest (expected) to be processed, it is in an embodiment first determined for each of the plurality of regions of interest which neural network will be used for processing the region of interest (before performing any neural network processing for any of the regions of interest), and then, once all the regions of interest being considered have been sorted to respective neural networks, all of the regions of interest that have been selected to be processed using the same neural network are processed using that selected neural network as a group (collectively), e.g. one after another.

Thus, in an embodiment, plural regions of interest that have been selected to be processed using the same neural network are processed together, as a group (collectively), using the selected neural network.

In one embodiment, this is done such that for each neural network that has been selected for processing at least some of the plural regions of interest to be processed, all of the regions of interest to be processed using the respective neural network are processed using that selected neural network before then processing the next set of regions using another selected neural network, and so on (i.e. such that all of the scaled versions of the regions of interest that are to be processed by a first neural network of the plurality of neural networks are processed first, then all of the scaled versions of the regions of interest that are to be processed by a second, different neural network of the plurality of neural networks are processed next, and so on).

By doing this, it is possible for the parameters of the neural networks (e.g. the weights for each node) only to be loaded into memory once (i.e. prior to processing the appropriate group of scaled regions) rather than multiple times when processing a given set of regions of interest. As a result, more efficient processing can be achieved as it is not necessary to switch between the neural networks on an input-by-input basis, for example.

Thus, in an embodiment, plural regions of interest to be processed are first identified (e.g. for a given frame or a sequence of plural frames), it is then determined which neural network is to be used for each of the identified plural regions of interest to be processed, the regions of interest are then grouped on the basis of which neural networks have been selected to process them, and then each respective group of regions of interest is processed using the appropriate selected neural network for that group of regions of interest together.

It will be appreciated in this regard that where plural regions of interest are organised into respective groups and then subjected to the appropriate neural network processing on a group basis, then where only a single neural network can be executed at a time, the respective groups of regions of interest may be and are in an embodiment processed using the different neural networks one after another, in turn. However, where plural neural networks can be executed in parallel (e.g. where the data processing system includes plural processors operable to execute neural networks or a single processor can execute plural neural networks in parallel), then the different groups of regions of interest could be processed in parallel, using respective different neural networks (e.g. executing on different processors). In general, the intention is, and the processing should be configured such that, there is no "interleaving" of processing of regions of interest that require different neural networks as part of any given neural network execution (e.g. on any given processor that is executing a neural network).

Thus, in an embodiment, a set of plural regions of interest to be processed (such as, and in an embodiment, all the regions of interest to be processed in a given frame (or in a given sequence of frames)) is first identified and the neural networks to be used to process the (plural) identified regions of interest selected, with the regions of interest then being grouped based on the neural network that has been selected to process them, and the regions of interest in each group then being processed collectively using the selected neural network as a group, e.g., and in an embodiment, such that all the regions of interest to be processed by a first neural network are processed by the first neural network separately to (and in an embodiment before) the regions to be processed by a second neural network, which are then processed using the second neural network, and so on, until all of the processing of the regions of interest has been performed.

In this case, the scaling of the regions of interest based on the selected neural network could either be performed for the regions of interest individually and independently (e.g. as and when the region of interest has been identified and the neural network to use for processing in the region of interest selected), or the scaling could be performed for regions of interest that are to be processed using a particular neural network collectively (as a group), i.e. such that the neural networks to use for all the regions of interest will first be selected, and then the scaling and processing with the appropriate neural networks will be performed for the (appropriate) regions of interest collectively (as a group).

Other arrangements would, of course, be possible.

The Applicants have further recognised that in these arrangements, it may, for example, be the case that relatively more regions of interest are selected to be processed using a particular neural network as compared to another neural network. Thus it may be, and is in an embodiment, determined after, e.g., and in an embodiment, initially selecting the neural networks to be used for plural regions of interest, whether an initially selected neural network should still be used for processing a region or regions of interest, or whether a different neural network should in fact be used. For example, where plural different neural networks have been selected for processing regions of interest of a set of plural regions of interest, it could be determined that where there is fewer than a threshold number of regions of interest to be processed using a particular neural network, those regions of interest should instead be processed using one of the other selected neural networks, to thereby avoid, for example, having to switch between, retrieve from memory and use so many different neural networks for processing the regions of interest. Since neural network kernels may require a large amount of data to be retrieved from memory, it is more efficient to reduce the number of switches between different neural networks so that the number of times the neural network data must be retrieved can be reduced.

As will be appreciated by those skilled in the art, the neural networks that are used to process the scaled regions of interest will typically, and in an embodiment do, comprise a plurality of layers of neural network processing, e.g., and in an embodiment, in dependence upon the particular processing of a region of interest that the neural network is configured to perform.

While in the normal course, a region of interest may be, and in an embodiment is, processed using the entirety (all the layers of) the neural network in question, in an embodiment, it is possible to omit one or more (some) of the layers of processing for a given neural network, for example in order to simplify execution or reduce resource usage. This is in an embodiment done and controlled on the basis of whether a particular condition or conditions for performing "reduced" processing is met or not. Thus, in an embodiment, only some (but not all) of the layers of a selected neural network are executed if a particular condition(s) is met.

In an embodiment, the condition is in an embodiment one or more of, in an embodiment plural of; and in an embodiment all of: that a battery level of a device is determined to be below a threshold value; that a computing capacity of a device is determined to be below a threshold value; and that the use case is such that executing only some but not all of the layers is deemed appropriate (with the condition being met, e.g., if any one of the conditions are met, or only if all of the conditions are met).

It will be appreciated that there may be a trade-off between accuracy and efficiency in the above scenarios. In an embodiment, the accuracy of the results of the neural network processing is monitored and the neural network processing is adjusted to execute more or fewer layers depending on the determined level of accuracy. Execution of more layers may result in higher accuracy while execution of fewer layers will result in reduced complexity and resource usage. In an embodiment, the minimum number of layers for execution is determined such that a certain level of accuracy is ensured while resource usage is minimized as far as possible.

The Applicants have further recognised in this regard that the different neural networks, although optimised for processing regions of interest of different sizes, may in fact have a number of layers of processing in common. For example, the initial layers of each of the neural networks may be the same (e.g. the nodes of the respective layers of each of the neural networks may have the same weights assigned to them).

In this case, where some (e.g. the initial) layers of processing of each of the different available neural networks are the same, then the processing of those layers is in an embodiment performed for all the regions of interest (irrespective of their size) collectively, with the separate processing for regions of interest of different sizes (and using different selected neural networks) then being done (only) for those parts of the neural networks that are different (and "size" specific). This may again facilitate improving efficiency, by avoiding the need to retrieve and load weights from memory for separate neural network processing in respect of the processing performed by the "common" layers.

Thus, in an embodiment, initial processing of the scaled versions of the regions of interest is performed collectively (in common) for all the regions of interest in question, irrespective of the sizes of the regions of interest (and the neural network that has been selected to process those regions of interest), with subsequent processing for the regions of interest (after that common processing) then being performed using the specific, selected neural networks, as appropriate.

The initial processing can then be, and is in an embodiment, performed for all sizes of input without needing to reload any new parameters (e.g. weights) for a separate neural network. In other words, the initial stages of processing by the neural networks can all be, and are in an embodiment, carried out for each input by the same neural network. In an embodiment, the initial processing (using the common layers) of each scaled version of a region of interest (input) is performed before any further processing is performed for any of the inputs.

This may be achieved in any suitable and desired manner.

For example, an initial, "common" neural network may be provided for performing the initial, common processing for the regions of interest, with there then being a set of neural networks each configured to more optimally process regions of interest of a particular size, that are then used for the subsequent, "size specific" processing after that initial common processing.

In an embodiment, it is possible to disable (omit) use of one or more of the available (supported) neural networks. For example, it may be determined that having, e.g. four, different available neural networks may be unnecessary for certain applications, such that it may be acceptable use only two neural networks optimised for processing regions of interest of different sizes. In this case therefore, only some but not all of the complete set of available neural networks may be made available and used for processing regions of interest for a particular application (for example). This may again be used to reduce complexity and correspondingly resource usage, where it is desired and/or possible to do that.

Such disabling (omission) of one or more (some) of the available neural networks is, again, in an embodiment done and controlled on the basis of whether a particular condition or conditions for performing "reduced" processing is met or not. Thus, in an embodiment, only some (but not all) of the available neural networks are executed if a particular condition(s) is met.

In an embodiment, the condition is in an embodiment one or more of, in an embodiment plural of; and in an embodiment all of: that a battery level of a device is determined to be below a threshold value; that a computing capacity of a device is determined to be below a threshold value; and that the use case is such that executing only some but not all of the neural networks is deemed appropriate (with the condition being met, e.g., if any one of the conditions are met, or only if all of the conditions are met).

It will be appreciated that there may be a trade-off between accuracy and efficiency in the above scenarios. Thus, again, in an embodiment, the accuracy of the results of the neural network processing is monitored and the neural network processing is adjusted to execute more or fewer neural networks depending on the determined level of accuracy. Execution of more neural networks may result in higher accuracy while execution of fewer neural networks will result in reduced complexity and resource usage. In an embodiment, the minimum number of neural networks for execution is determined such that a certain level of accuracy is ensured while resource usage is minimized as far as possible.

In this case, in an embodiment, when it is being considered to omit the use of one of the available neural networks, in an embodiment a region of interest that would be processed using that selected neural network is processed using one or more of the other available neural networks, and the results of that processing considered, to thereby determine (based on the results of the processing) whether the particular neural network can be disabled (omitted from being available) or not.

For example, if the system supports four neural networks that are optimized, respectively, for inputs of sizes $4\times4$, $16\times16$, $64\times64$ and $512\times512$, it may be determined that providing two neural networks that are optimized for $4\times4$ and $16\times16$ inputs, respectively, is not of sufficiently great benefit for a particular application. In particular, one or more respective regions of interest that would otherwise have been processed using the neural network that is optimized for inputs of size $16\times16$ could instead be input to each of the neural networks that are optimized for inputs of size $4\times4$ and $64\times64$, and the outputs monitored (e.g. for accuracy and/or quality) and, if (when) it is determined that acceptable results are obtained without using the neural network that is optimized for inputs of size 16×16, that neural network may no longer be executed (with the scaled versions of regions of interest that would otherwise have been processed by the neural network optimized for 16×16 inputs then instead being processed using the neural networks optimized for 4×4 or 64×64 inputs).

In this way, complexity may further be reduced and memory usage may be decreased. In addition, by downscaling the regions of interest further (e.g. to 4×4 pixels instead of 16×16 pixels), the amount of processing required for each region of interest will also be reduced.

The technology described herein can be used for any application where it is desired to process regions of interest in frames (e.g. images). Thus, it may be used, for example, for hand tracking, gesture classification, background replacement, body pose estimation, 3D object recognition, character image improvement, optical character recognition, facial recognition, and motion tracking.

One use of the technology described herein is in systems that use "spacewarp" processes, for example in a virtual reality (VR) or augmented reality (AR) or mixed reality (MR) head mounted display (HMD) system. "Spacewarp" determines the motion of objects between frames in a sequence of frames and uses the determined motion to generate extrapolated frames that can be inserted into a rendered sequence of frames in order to increase the frame rate. Since the spacewarp process can typically be performed in parallel with the rendering of application frames, it is often referred to as "asynchronous spacewarp". The technology described herein can be, and is in an embodiment, used to process regions of interest within one or more frames of a sequence of frames for the purpose of object identification and tracking in (asynchronous) spacewarp processes. Thus, in an embodiment, the technology described herein is used for, and when performing, object identification and tracking when performing (asynchronous) spacewarp processes in a VR or AR system. (US patent application publication No. 2020/0410740 A1 contains further details on asynchronous spacewarp and is incorporated by reference herein.)

The technology described herein can comprise, and be implemented in and as, any suitable and desired data processing system. Correspondingly, the data processing system of the technology described herein may be implemented as part of any suitable electronic device or devices which may be required to perform neural network processing, e.g., such as a desktop computer, a portable electronic device (e.g. a tablet, mobile phone, wearable device or other portable device), a medical device, automotive device, robotic device, gaming device, or other electronic device. Thus the technology described herein also extends to an electronic device that includes the data processing system of technology described herein (and on which the data processing system operates in the manner of the technology described herein).

The data processing system may comprise any desired components and elements that a data processing system can comprise, such as one or more or all of: a central processing unit (CPU), a graphics processing unit (GPU) (graphics processor), a video processor, a digital signal processor, one or more neural network processors, a display processing unit (display processor), a display and a memory.

One or more (or all) of the processors of the data processing system may be arranged within a system-on-chip system.

The processor operable to execute neural network processing may comprise any suitable processor that is capable of doing that, such as a central processing unit (CPU), a graphics processing unit (GPU) (graphics processor), a video processor, a sound processor, an image signal processor (ISP), a digital signal processor, and a Neural Network Accelerator/Processor. In an embodiment, the processor operable to execute neural network processing is a neural network processor (NPU) which is specifically configured for performing neural network processing. There may be more than one processor in the data processing system that is operable to execute neural network processing (and that is used to perform the neural network processing of the technology described herein), if desired.

The processor(s) should, and in an embodiment does, include appropriate processing circuits, logic, etc., suitable for performing neural network processing operations.

The data processing system may comprise and/or be in communication with one or more memories (such as the memories described above) that store the data described herein, and/or store software for performing the processes described herein. The data processing system may comprise and/or be in communication with a host microprocessor, and/or with a display for displaying output data associated with the neural network processing.

The data processing system of the technology described herein may be implemented as part of any suitable system, such as a suitably configured micro-processor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuits, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuits may share processing circuits, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a non-transitory physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a data processing system 100 which may be configured to perform neural network processing in the manner of the technology described herein. The system 100 comprises a System on Chip (SoC) 110. Parts of the data processing system which may be on chip comprise an image signal processor (ISP) 102, a video decoder 103, an audio codec 104, a CPU 105 and a neural network processor (NPU) 106, which may be operably connected to a memory controller 108 by means of a suitable interconnect 107. The memory controller 108 may have access to external, off-chip, main memory 109.

A sensor (such as a camera) 101 may provide input frames (images) for the system 100.

Although a CPU 105 and NPU 106 are shown separately in FIG. 1, processing relating to neural networks could be executed by the CPU 105 or another processor such as a GPU, if desired.

The system on chip may also comprise one or more local (on-chip) memories, which the NPU 106 (or other processor executing neural network processing) can access when performing processing.

Although the data processing system shown is of the form of a system-on-chip, the data processing system could alternatively (or additionally) comprise a distributed processing system (comprising a plurality of computing devices), or a cloud-based processing system, or any other suitable and desired data processing system.

The data processing system of the present embodiments may be part of any suitable electronic device which may be required to perform neural network processing, e.g., such as a desktop computer, a portable electronic device (e.g. a tablet, mobile phone, wearable device or other portable device), a medical device, automotive device, robotic device, gaming device, or other electronic device.

As discussed above, the technology described herein relates to the identification and subsequent processing using a neural network of regions of interest in an input frame, such as an image. Thus, image frames generated the sensor 101 in the data processing system shown in FIG. 1 may be analysed in the manner of the present embodiments to identify regions of interest in the images, with the regions of interest then being processed by an appropriate neural network, for example executing on the NPU 106.

In the present embodiments, and in accordance with the technology described herein, it is assumed that the data processing system, such as the NPU 106, can execute a plurality of different neural networks, with each neural network being configured for, and to more optimally process, a particular size of input (for example in terms of the number of pixels (data elements) when processing images).

In the present embodiments and in accordance with the technology described herein, when an image of interest is identified in an image to be processed, the size of the region of interest is determined, and then the neural network to use to process the region of interest is selected based on the determined size of the region of interest. The region of interest is then scaled based on the selected neural network, and the scaled version of the region of interest is input to the selected neural network for processing (e.g. to attempt to classify the object that the region of interest includes (represents)).

Figure 2:
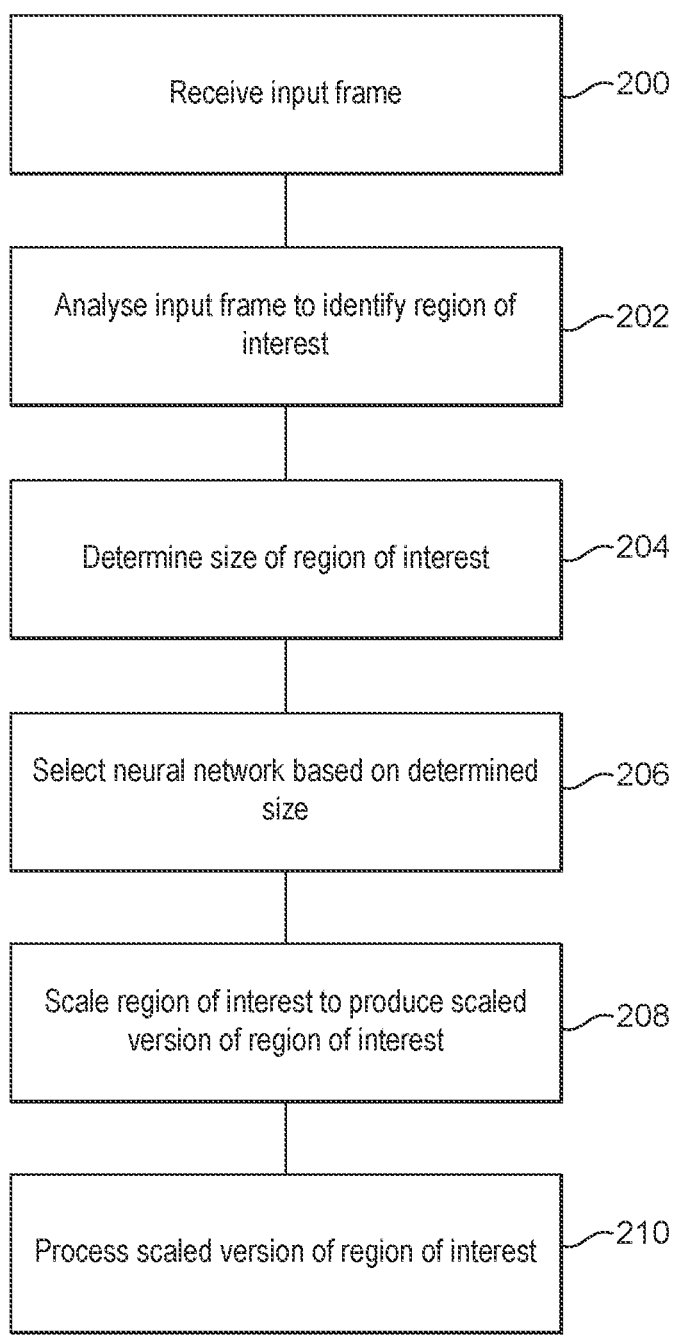
FIG. 2 shows an overview of the processing that is performed in an embodiment of the technology described herein.

FIG. 2 illustrates this overall operation.

As shown in FIG. 2, the process starts with an input frame, in the present embodiments comprising an image from the sensor 101 (step 200).

The input frame (image) is then analysed to identify a region or regions of interest in the frame (image) to be analysed further (step 202). In the present embodiments, the regions of interest are identified based on depth data for the frame (image), although other methods of region of interest identification could also or instead be used, if desired.

For each region of interest, the size of the region of interest is determined (step 204), in the present case as a height and width in pixels of the region of interest.

The determined size of a region of interest is then used to select the neural network to be used to process the region of interest (step 206). In the present embodiments, it is assumed that the data processing system 100 supports neural networks that are configured to more optimally process regions of interest having sizes of 50×50, 100×100 and 200×200 pixels (and also supports a more general "non-size specific" neural network). (Other arrangements would, of course, be possible).

Once a neural network to be used to process a region of interest has been selected based on the determined size of a region of interest, the region of interest is then scaled based on the selected neural network to be used to process the region of interest (step 208). As will be discussed further below, this scaling is done so as to match the size of the region of interest selected from the input frame to the input size that the selected neural network is configured for.

In the present embodiments, all of the regions of interest identified in a frame (image) (or desired sequence of frames (images)) to be processed are first sorted into respective lists (bins) corresponding to the particular neural network that has been selected to process the region of interest.

The processes of identifying regions of interest, determining their sizes and selecting a neural network to use to process the selected regions of interest and then scaling the regions of interest, can be carried out on any suitable and desired component and processor of the overall data processing system 100. This may be done, for example, on the ISP 102, or the CPU 105, or distributed between the ISP 102 and the CPU 105, for example.

Once all the regions of interest have been sorted into respective neural network lists for processing (and scaled), then the processing of the regions of interest using the selected neural networks is performed (step 210).

In the present embodiments, the different neural networks are executed in turn, for all the regions of interest to be processed using the respective neural network. Thus, a first one of the available neural networks will be used to process all the regions of interest for which that neural network has been selected, and then a next neural network will be used to process all the regions of interest for which that neural network has been selected, and so on.

Once all the regions of interest for a, e.g., frame (image) have been processed in this way, then the next frame (image) may be processed, and so on.

Figure 3:
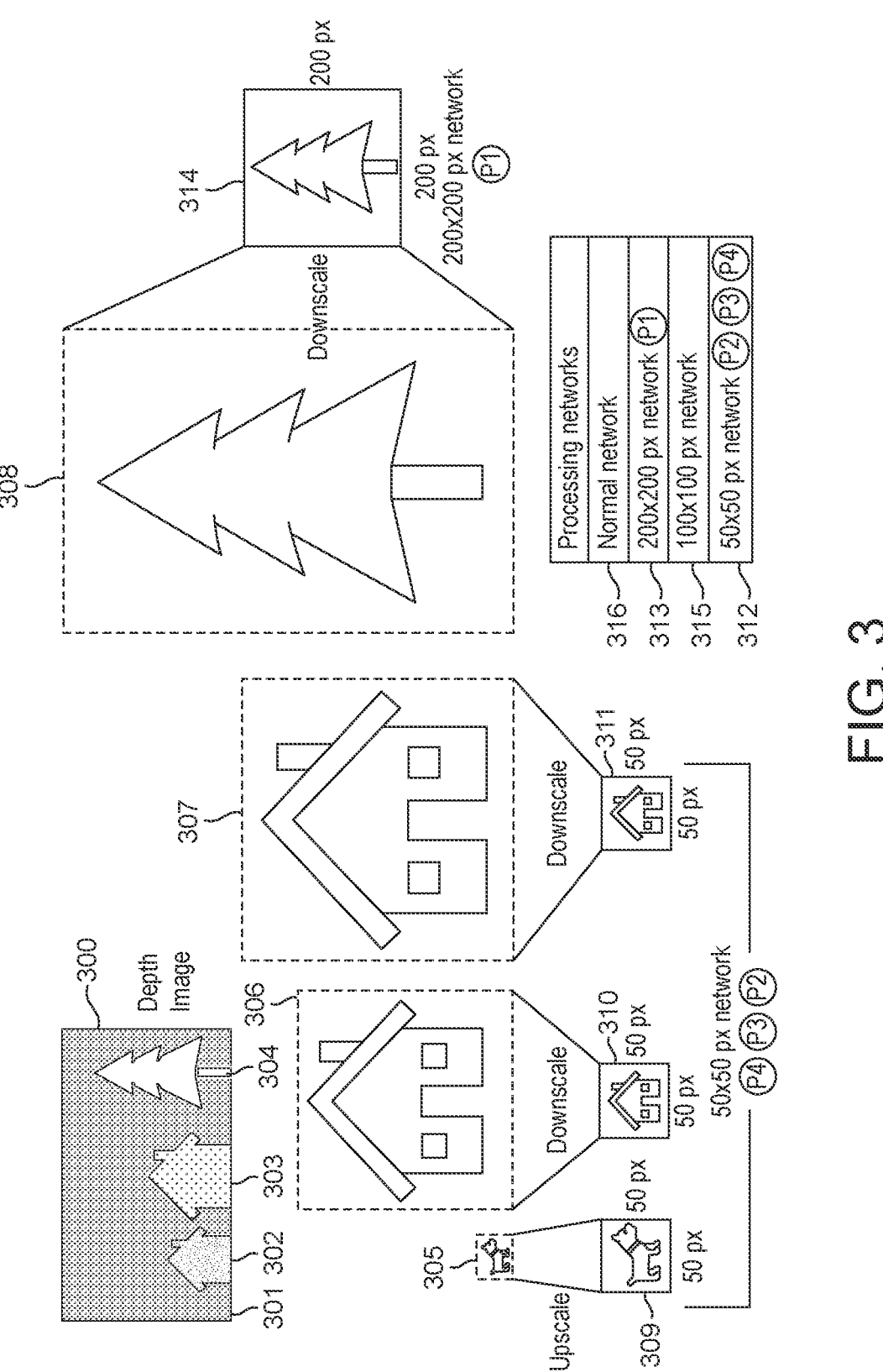
FIG. 3 shows schematically processing for an image in an embodiment of the technology described herein.

FIG. 3 illustrates the operation in the embodiments of the technology described herein for an exemplary frame (image) 300 that is assumed to include four different objects that it may be desired to process further using a neural network, namely a dog 301, a first house 302, a second house 303, and a tree 304.

The image 300 has associated depth information that indicates the distance of the objects within the scene depicted in the frame 300 from the viewpoint (e.g. from the perspective of a camera taking a picture of the scene).

FIG. 3 illustrates four neural networks that are available for processing regions of interest identified in a frame (image). A first "standard" neural network 316 that has not been optimised for inputs of a particular size (but that can, for example, be used for inputs of any size, albeit with potentially lesser accuracy), a second neural network 313 that has been optimised for inputs of size 200×200 pixels, a third neural network 315 that has been optimised for inputs of size 100×100 pixels, and a fourth neural network 312 that has been optimised for inputs of size 50×50 pixels.

As discussed above, the frame 300 is first processed in order to identify regions of interest to be processed further using neural network processing. In the present case, as illustrated in FIG. 3, this is done using depth information for the image, and as illustrated in FIG. 3 this will be used to identify respective regions of interest 305, 306, 307 and 308 corresponding to the different objects 301, 302, 303 and 304 that are present in the frame 300. As shown in FIG. 3, a rectangular region of interest containing and corresponding to the object that can be identified from the depth information in the image 300 is identified in the image 300 for further processing.

In the example illustrated in FIG. 3, it is assumed that the 50×50 pixel neural network will be selected for processing the regions of interest 305, 306, 307 corresponding to the dog 301 and houses 302 and 303 on the basis of the sizes of those regions of interest. Accordingly, each of the regions of interest 305, 306 and 307 will be scaled to form 50×50 pixel sized scaled regions of interest 309, 310 and 311, respectively, for processing by the 50×50 pixel neural network 312. (As shown in FIG. 3, to do this for the region of interest 305 corresponding to the dog 301, that region of interest will be upscaled to a size of 50×50 pixels, whereas for the regions of interest 306 and 307 corresponding to the houses, those regions of interest will be downscaled to a size of 50×50 pixels.)

In the case of the region of interest 308 corresponding to the tree 304, as that region of interest is bigger, as shown in FIG. 3, the 200×200 pixel neural network 313 will be selected for processing that region of interest. Accordingly, the region of interest 308 will be downscaled to a size of 200×200 pixels to form a scaled version 314 of the region of interest corresponding to the tree 304 for then processing by the 200×200 pixel neural network 313.

The appropriately scaled regions of interest will then be processed by the appropriate and selected neural network, for example, to attempt to classify and identify the object that is present in the region of interest.

Figure 4:
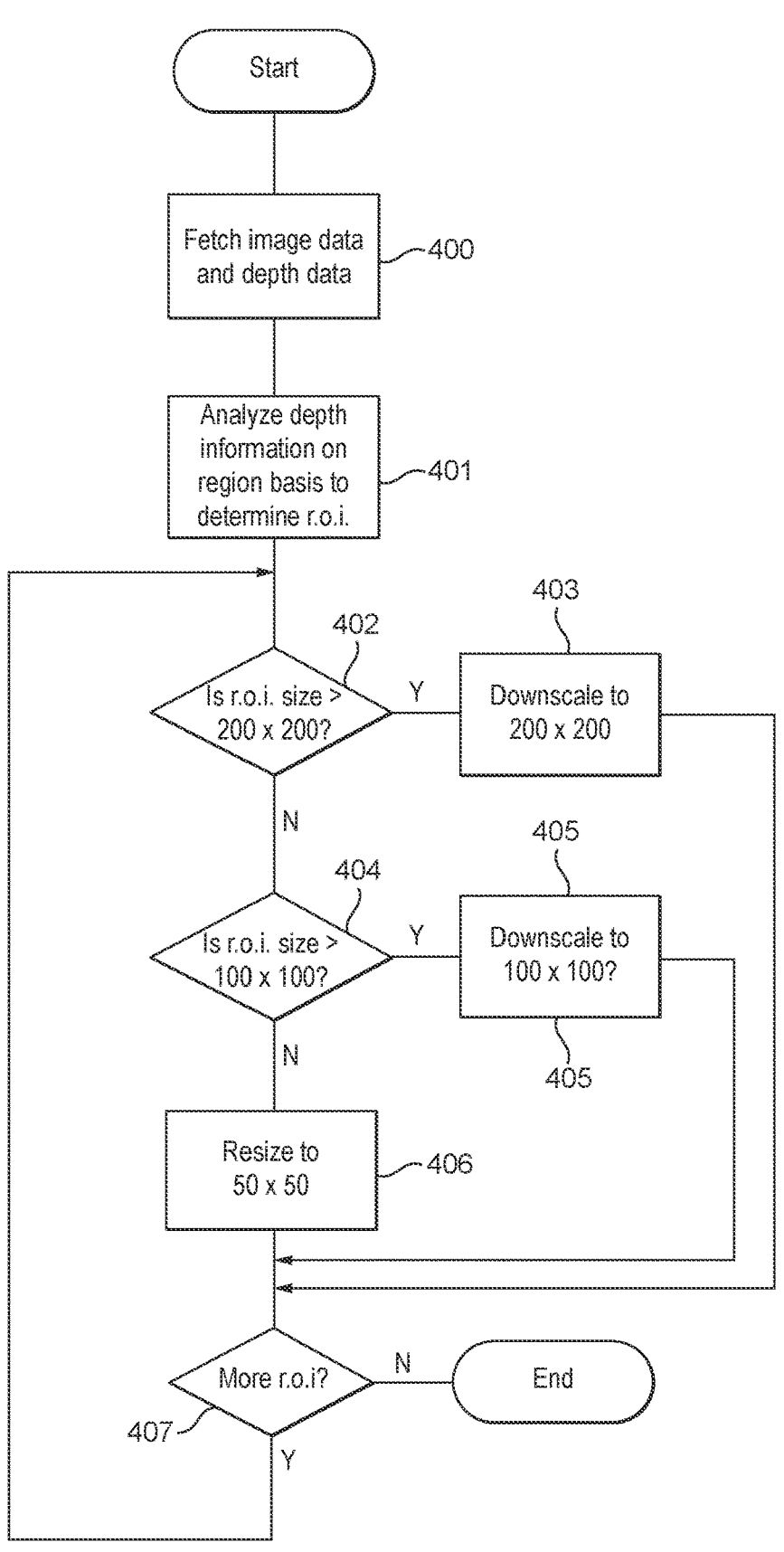
FIG. 4 is a flowchart setting out processing steps in an embodiment of the technology described herein.

FIG. 4 shows in more detail the selection of neural networks to use for processing a region of interest and the corresponding scaling of a region of interest (corresponding to steps 200 to 208 shown in FIG. 2) in an embodiment of the technology described herein.

As shown in FIG. 4, the process starts by fetching the appropriate image and depth data for the input frame (image) to be processed (step 400).

The depth information for the input image is then analysed on a region basis to identify potential objects and thus corresponding regions of interest to be processed further in the input image (step 401).

Then, for each region of interest identified in the input image, the size of the region is determined and it is first determined whether the size of the region of interest is greater than 200×200 pixels (step 402). If so, the 200×200 input size neural network is selected for processing the region of interest, and the region of interest is downscaled to a size of 200×200 pixels (step 403). (It is again assumed here that the data processing system supports the execution of neural networks optimised to sizes of 50×50, 100×100 and 200×200 pixels, respectively.)

On the other hand, if the region of interest is smaller than 200×200 pixels, it is then considered whether it is greater than 100×100 pixels (step 404). If so (i.e. the region of interest is between 200×200 and 100×100 pixels in size), the 100×100 pixel neural network is selected for processing the region of interest, and the region of interest is correspondingly downscaled to a size of 100×100 pixels (step 405).

On the other hand, if the region of interest is smaller than 100×100 pixels, then the 50×50 pixel neural network is selected as the neural network to use for processing the region of interest, and the region of interest is resized to a size of 50×50 pixels (which may comprise upscaling or downscaling the region of interest, as appropriate (step 406)).

This is repeated for each of the identified regions of interest to be processed for the input image (step 407).

Once this process is finished, the neural network for processing each identified region of interest in the input image will have been selected, with the regions of interest appropriately scaled to match the neural network that has been selected for their processing.

The scaled versions of the regions of interest, and the identification of which neural network should be used for processing the respective regions of interest should be, and are in an embodiment, appropriately stored for future use (to trigger and then use for the neural network processing). They may, for example, be stored in local storage of or available to the system on-chip 110, and/or in the off-chip memory 109, as desired.

Figure 5:
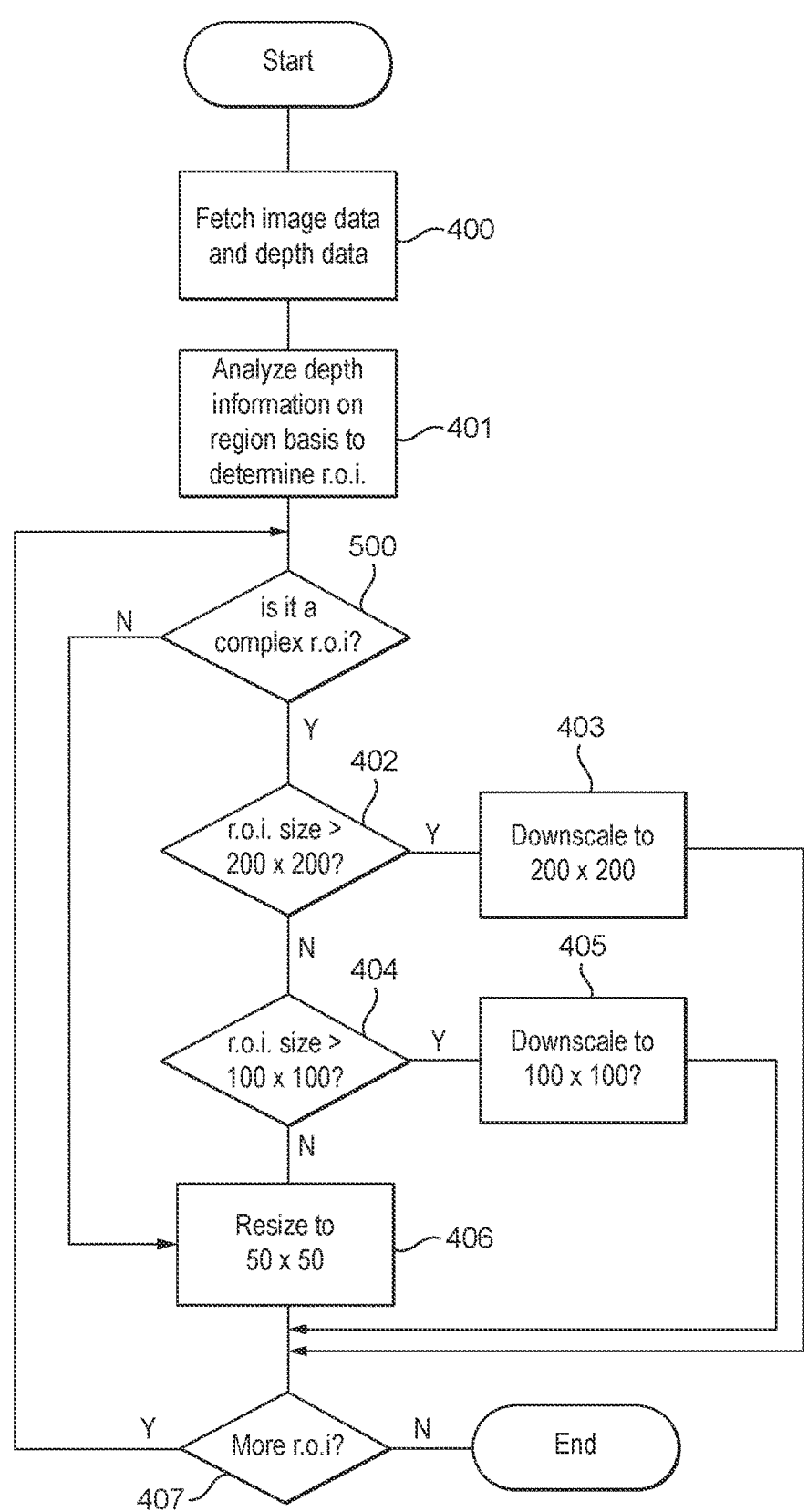
FIG. 5 is a flowchart setting out processing steps in another embodiment of the technology described herein.

FIG. 5 shows an alternative embodiment to the operation shown in FIG. 4. In FIG. 5, corresponding steps to the steps shown in FIG. 4 are indicated using the same reference numerals (and so will not be described in detail again).

In FIG. 5, as compared to the operation shown in FIG. 4, the selection of different sized neural networks is only made for regions of interest that are determined to be "complex".

For all other (non-complex) regions of interest, as shown in FIG. 5, the 50×50 input neural network is used (and the regions of interest are correspondingly resized to 50×50 pixels), irrespective of their "original" size.

Thus, as shown in FIG. 5, there is an initial step for each region of interest to be considered of determining whether the region of interest is to be considered a "complex" region of interest or not (step 500), with the subsequent processing then being performed accordingly.

In the present embodiment, regions of interest are identified as being complex (potentially containing complex objects) in the case where the region of interest comprises obscured or overlapping objects (which may be identified, for example, and in an embodiment, based on the depth information associated with the input image).

Figure 6:
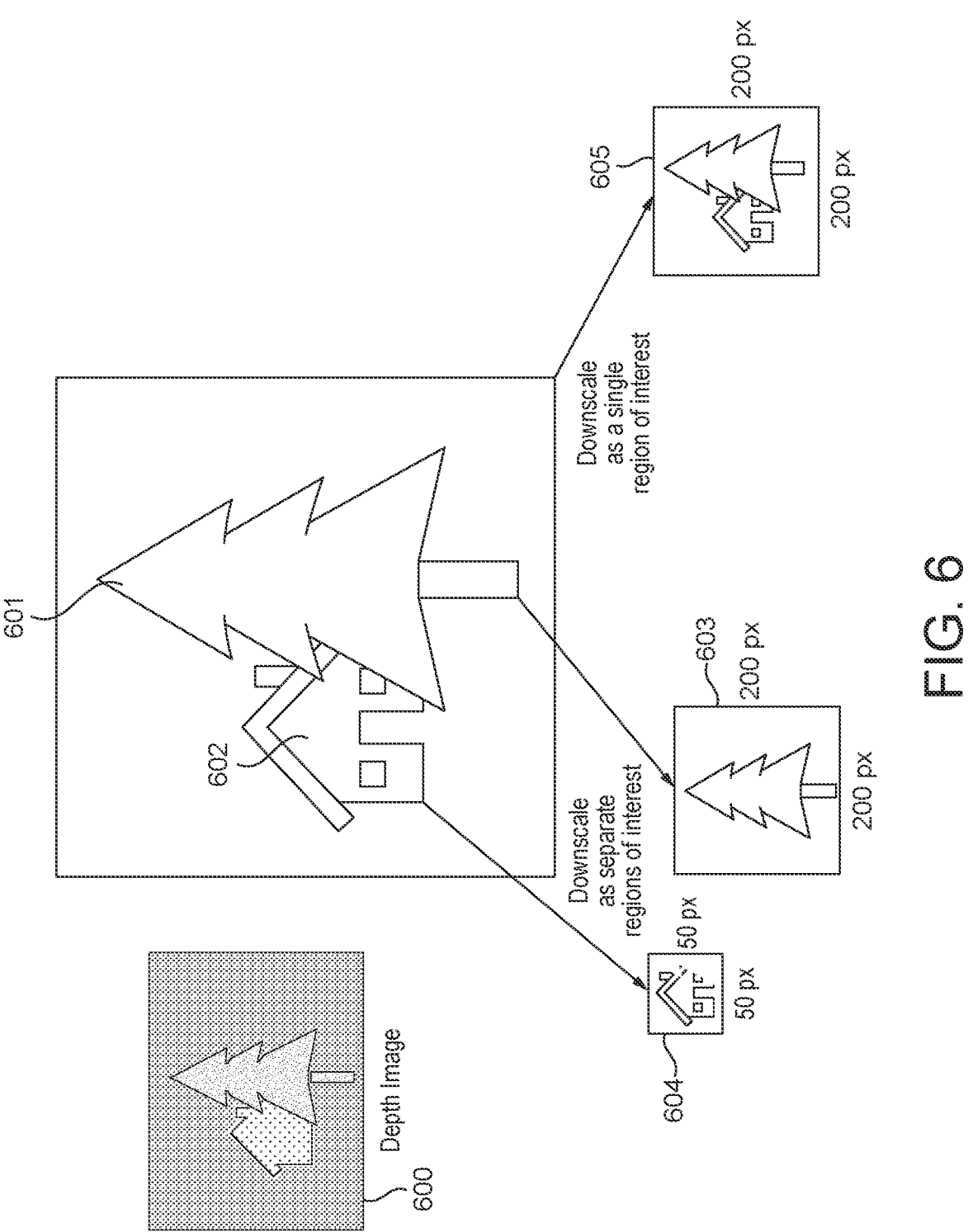
FIG. 6 shows schematically processing for an image in an embodiment of the technology described herein.

FIG. 6 illustrates this, and shows for an image 600 having a tree 601 overlapping a house 602, that the depth information may be used to identify and generate separate regions of interest 603, 604 for the tree 601 and house 602, respectively, or to identify and generate for processing a single "complex" region of interest 605 that includes both the house and the tree. In the case where the overlapping objects are extracted as a single "complex" region of interest 605 for processing, then this can be recorded and identified as such, and that will then trigger the "complex" region of interest processing in the process shown in FIG. 5.

Other factors for determining whether a region of interest is to be treated as a "complex" region of interest in the process of FIG. 5 would, of course, be possible.

For example, any non-square region of interest (object) could be considered to be a "complex" region of interest, and/or the depth information (and potential image information) could be used to determine whether the potential object in the region of interest is simple (e.g. planar) or complex (and to denote the extracted region of interest accordingly). For example, the outline of the object in the region of interest could be determined and used to determine whether the object is simple or complex. For example, a tree may be considered to be "complex", but a ball "simple".

Also, although FIG. 5 shows processing non-complex regions of interest simply using the "smallest size" neural network, with a selection of different size neural networks to use only being made for regions of interests that are determined to be "complex", other arrangements would be possible. For example, "complex" regions of interest could be processed using the more general, standard neural network, with "non-complex" objects then being processed using the appropriate size specific neural network. Other arrangements would, of course, be possible.

As discussed above, once a neural network to use for processing a region of interest has been selected, the region of interest is scaled to match the input size that the neural network is configured for. The scaling may be done in any suitable and desired manner.

As discussed above, in the present embodiments the neural networks are configured to more optimally process square inputs of a particular size. In the case where the identified region of interest is not square, then in an embodiment the scaled version of the region of interest that is input to the neural network for processing is square (made square).

In the present embodiments, this is done by first scaling the identified non-square region of interest to an appropriate size whilst maintaining the embodiment ratio of the region of interest, but then padding the so-scaled region of interest with dummy values to form a square region of interest for input to the selected neural network.

Figure 7:
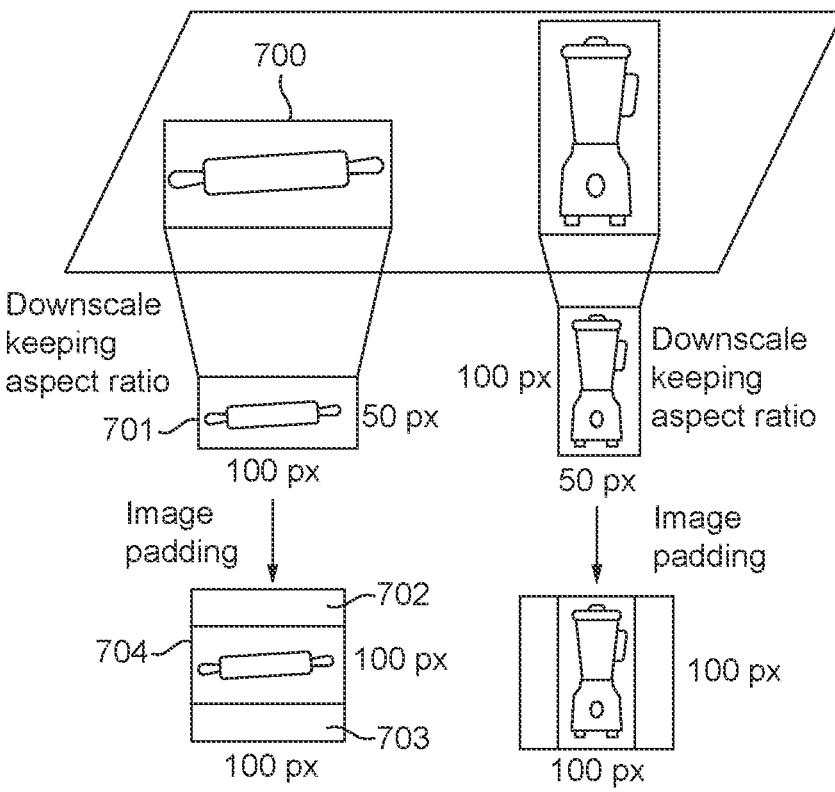
FIG. 7 illustrates scaling of a region of interest in an embodiment of the technology described herein.

FIG. 7 illustrates this, and shows the downscaling of an exemplary region of interest 700 to a downscaled version of the region of interest 701 that has the same embodiment ratio, and then padding the downscaled version 701 of the region of interest with dummy values 702, 703, to form a square scaled version 705 of the region of interest for input to the neural network in question.

Other arrangements would be possible. For example, one or more of the available neural networks could be configured to accept non-square embodiment ratio inputs. Alternatively, rather than padding the non-square embodiment ratio scaled region of interest, the region of interest could otherwise be processed (e.g. pre-processed) to stretch the region of interest in the desired dimension to make it square (e.g. such that the scaling would not maintain the original embodiment ratio). In this case, a neural network trained to use the modified embodiment ratio is in an embodiment used to process the region of interest and/or information describing the embodiment ratio modification may be provided to the neural network processing (e.g. so that the original embodiment ratio may be obtained).

Figure 8:
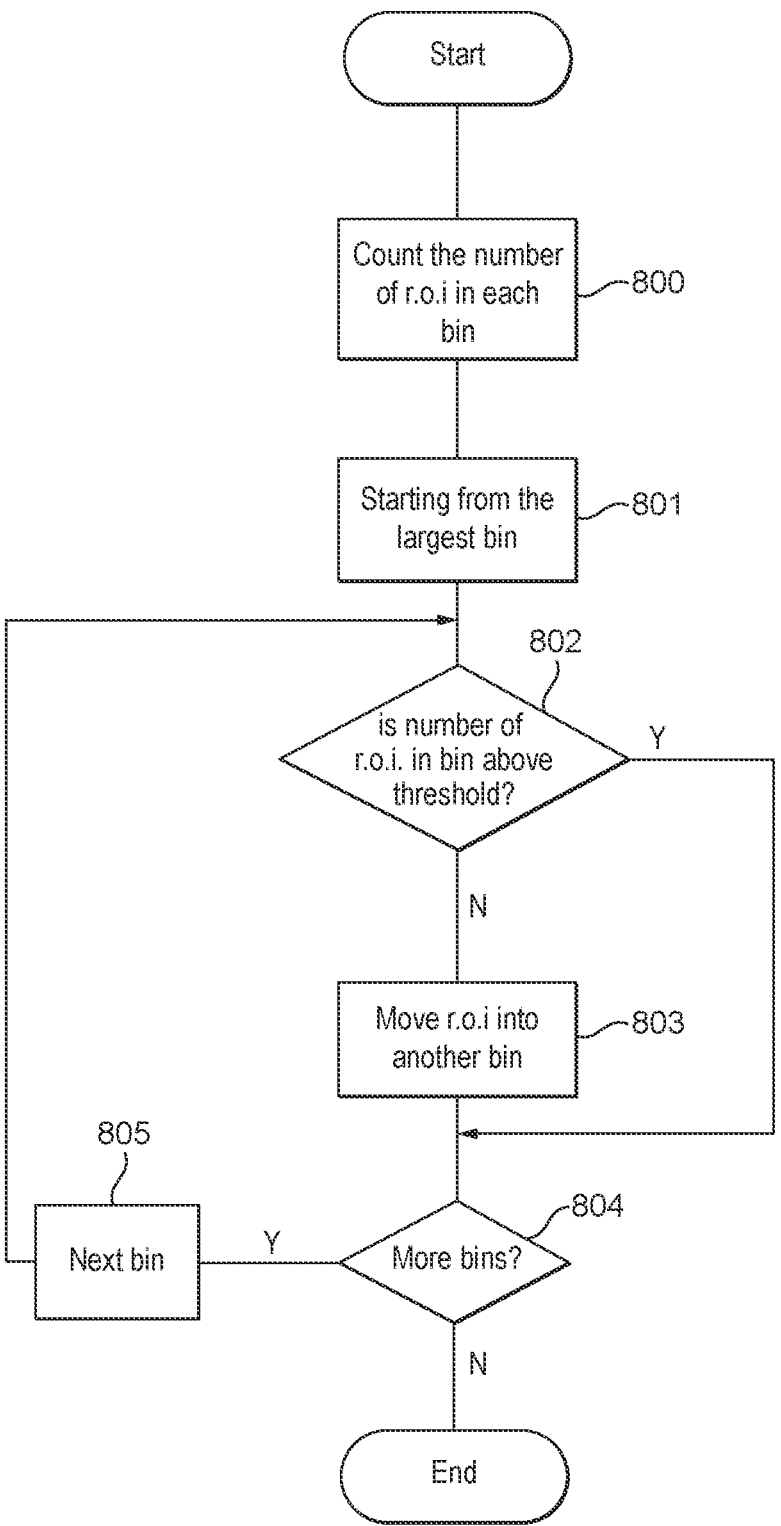
FIG. 8 is a flowchart setting out processing steps in an embodiment of the technology described herein.

FIG. 8 shows a further process that may be performed after the operations shown in FIGS. 4 and 5, i.e. after the regions of interest have been sorted for processing by the different available neural networks based on their respective sizes.

In the process shown in FIG. 8, it is determined how many different regions of interest are to be processed by a respective neural network, and when the number of regions of interest to be processed by a respective neural network is lower than a threshold, those regions of interest are instead moved to be processed by a different neural network. This can then streamline the neural network processing and avoid, for example, having to use and retrieve from memory lots of different neural networks but each only processing a very small number of regions of interest, which could be inefficient.

Thus, as shown in FIG. 8, in this case, it is determined how many regions of interest are to be processed by each different neural network (step 800). Then, starting with the neural network that has the largest number of regions of interest to process (step 801) it is determined whether the number of regions of interest for that neural network is above the threshold minimum number of regions of interest to be processed by a neural network (step 802).

If so (i.e. there are more regions of interest than the threshold minimum number of regions of interest to be processed using the neural network), then those regions of interest can be and will be processed using the selected neural network. On the other hand, if there is fewer than the threshold number of regions of interest to be processed using the particular neural network, then those regions of interest are allocated to another neural network (step 803) (and the original neural network will not be used for processing regions of interest for the image in question).

This is repeated for each neural network that has been selected to process at least some regions of interest in the image in question (steps 804 and 805).

The effect of this then is that at the end of this process, each neural network will, if possible, be used to process at least the minimum threshold number of regions of interest (and no more than one neural network will be used to process fewer than the threshold minimum number of regions of interest).

Once all the regions of interest to be processed for a frame (image) (for example) have been sorted for processing by respective neural networks (as discussed above) and appropriately scaled, then the regions of interest can be and are in an embodiment, processed using the selected neural networks.

Figure 9:
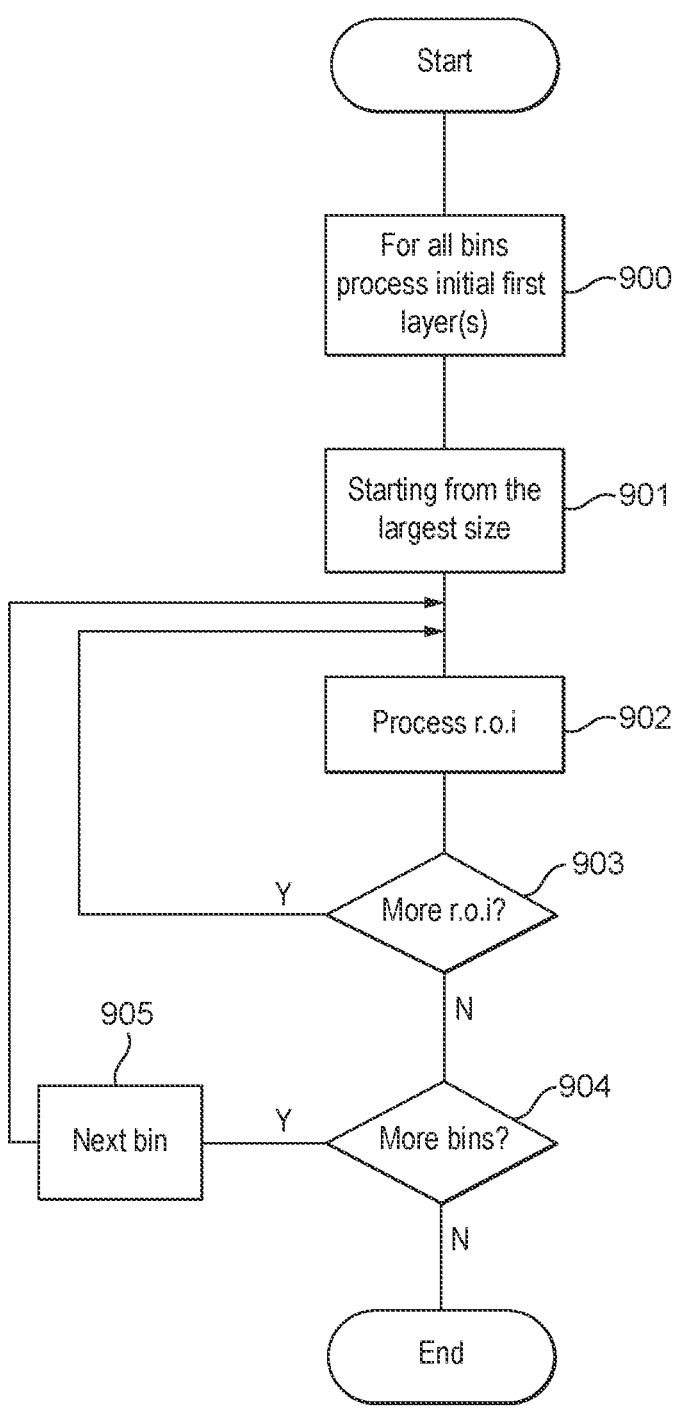
FIG. 9 is a flowchart setting out processing steps in an embodiment of the technology described herein.

FIG. 9 illustrates this process in an embodiment of the technology described herein.

In the embodiment shown in FIG. 9, all of the regions of interest to be processed with a respective neural network are processed together, using that neural network, before the regions of interest to be processed using a next neural network are processed using that next neural network, and so on. In other words, the different neural networks are executed in turn, one after another, and all the regions of interest to be processed using a given neural network are processed collectively while the neural network is in use.

Furthermore, and as shown in FIG. 9, it is assumed that although each of the different neural networks is configured for processing inputs of a particular size, the initial layers of each of the different size-specific neural networks will in fact be the same.

Figure 10:
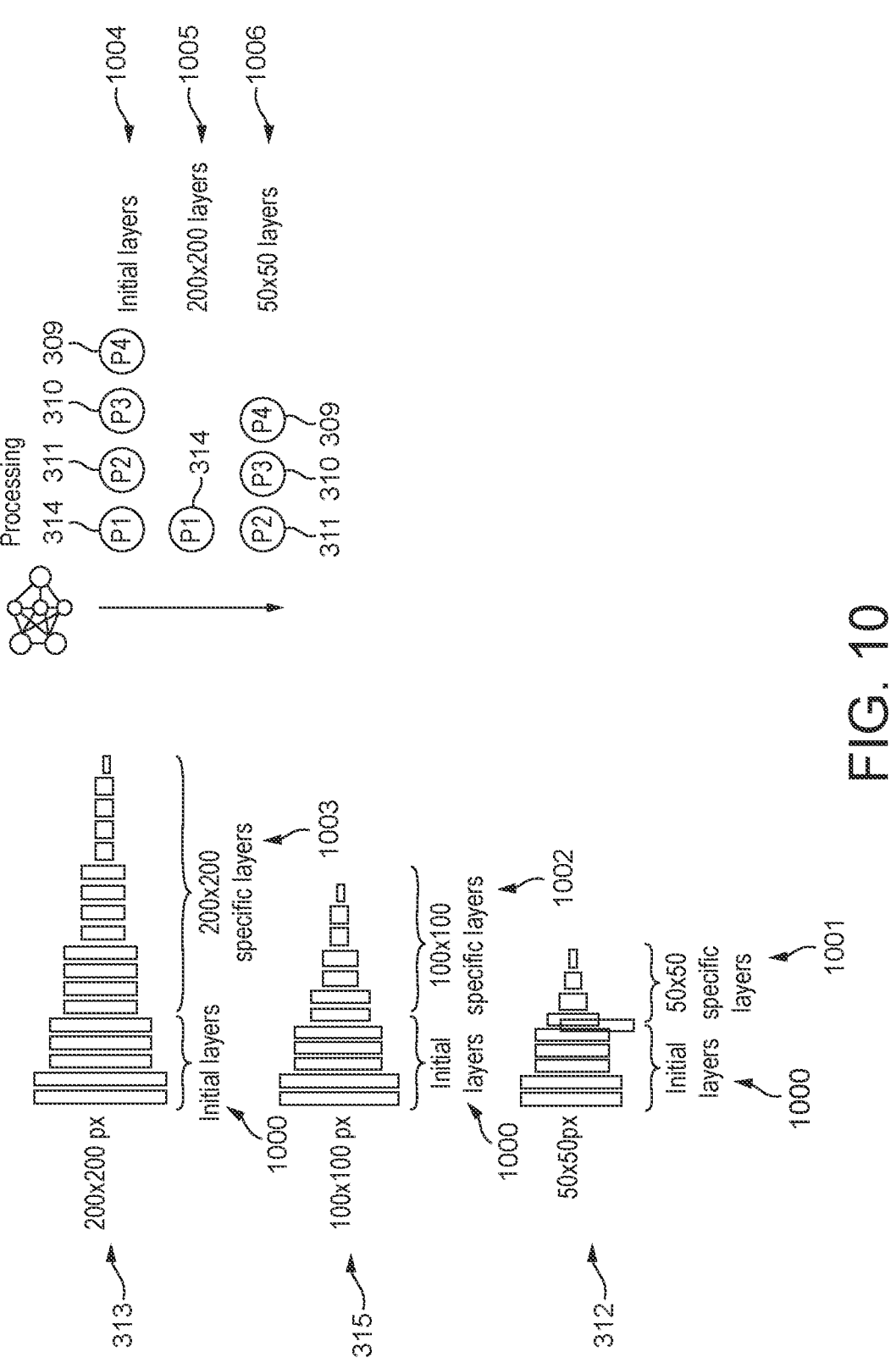
FIG. 10 illustrates embodiments of the processing shown in FIG. 9.

FIG. 10 illustrates this, and shows that for each of the respective 50×50, 100×100 and 200×200 pixel input neural networks 312, 315 and 313, there is a common set of initial layers 1000, which are then followed by a respective set of "size specific" layers 1001, 1002 and 1003, respectively.

(FIG. 10 also shows schematically that the larger 200×200 network is a more complex network than the 50×50 network. Also, although not shown in FIG. 10, the network layers for the 200×200 network will be twice as large as the layers for the 100×100 neural network (and so on).)

As shown in FIG. 10, given the presence of the common initial layers 1000 in each of the neural networks, and to exploit that, when performing the neural network processing for regions of interest, the common initial layers are executed for all the regions of interest together first 1004, with the size specific layers processing then being performed thereafter for the respective regions of interest in question.

Thus, as illustrated in FIG. 10, and considering the example image to be processed shown in FIG. 3, the initial layers of the neural networks will be executed for each of the regions of interest 309, 310, 311 and 314 together (1004), but then the individual size specific neural network layers will be executed for the different regions of interest collectively for the regions of interest to processed by the neural network in question. Thus in this case, once the initial layer processing has been completed, the scaled region of interest 314 to be processed using the 200×200 pixel neural network is processed (1005), followed by processing the remaining regions of interest 309, 310 and 311 using the 50×50 neural network (1006).

As all the regions of interest for unique network layers are processed together, that will reduce the amount of data that may need to be fetched for the neural network processing. Also, for the common layer processing, it could be the case that the common, initial layers will use the same kernels for all sizes of regions of interest. If the kernels are the same then the amount of data to process will be different for different sized scaled regions of interest FIG. 9 shows this operation.

Thus, as shown in FIG. 9, when processing the identified and scaled regions of interest using the neural networks, first of all the regions of interest are processed together using the common, initial first layer(s) (step 900).

Then, starting from the largest size input neural network, all of the regions of interest to be processed using that larger size neural network are processed (steps 901, 902 and 903).

Then, if there are other size neural networks to be executed for processing regions of interest, the process is repeated for the next size specific neural network, and so on, until all the desired neural network processing has been performed (steps 904 and 905).

The neural network processing that is performed for a region of interest may be any suitable and desired neural network processing that it may be desired to perform for a region of interest. Thus it may, for example, and in an embodiment, comprise attempting to classify an object that is depicted in the region of interest.

It would also be possible to omit the common initial layer processing shown in FIGS. 9 and 10 if desired (or in the case where the initial layers are not in fact the same for all the neural networks). In that case, each respective neural network will be used to process the regions of interest for which that neural network has been selected as a group, before then moving on to the next neural network, and so on.

It can be seen from the above that the technology described herein, in its embodiments at least, can provide a more efficient and optimal processing of regions of interest identified in input frames (such as images) using neural network processing. This is achieved, in the embodiments of the technology described herein at least, by providing a plurality of neural networks configured to more optimally process regions of interest of different sizes, and then selecting a neural network to use for a region of interest based on the size of the region of interest and scaling the region of interest based on the selected neural network before then processing the region of interest using the selected neural network.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system which can execute a plurality of neural networks, each neural network operable to process regions of interest identified in a frame to be processed and each configured to more optimally process a region of interest of a respective size, wherein the respective size of a region of interest that can be more optimally processed is different for different ones of the plurality of neural networks that the data processing system can execute, the method comprising, for a frame to be processed:

identifying a plurality of regions of interest for processing within the frame and, for respective ones of the plurality of regions of interest identified for processing:

determining a size of the region of interest within the frame;

selecting, based on the determined size of the region of interest within the frame, one of the plurality of neural networks to use to process the region of interest; and scaling the region of interest to produce a scaled version of the region of interest, the scaling determined based on the selected neural network;

the method further comprising:

sorting regions of interest identified for processing into groups based on the neural networks selected to process different ones of the regions of interest; and processing the groups, wherein processing a group comprises processing the scaled versions of the regions of interest in the group using the selected neural network or neural networks for processing the regions of interest in the group, and wherein the order in which the scaled versions of the regions of interest are allocated for processing is controlled based on the groups that the regions of interest are sorted into, such that for at least a first group and a second group:

all of the scaled versions of the regions of interest in the first group are allocated to be processed before any of the scaled versions of the regions of interest in the second group are allocated to be processed.

2. The method of claim 1, wherein the frame is an image.

3. The method of claim 1, wherein identifying a region of interest within a frame comprises identifying a region of data positions in the frame that have the same or similar values for a property.

4. The method of claim 3, wherein the property is depth.

5. The method of claim 1, comprising selecting the neural network that is optimized for the closest smaller size of region of interest to the determined size of the region of interest to be processed where possible.

6. The method of claim 1, wherein scaling the region of interest includes changing the shape of the region of interest.

7. The method of claim 1, wherein the scaled version of the region of interest is padded with dummy values in order to change the shape of the scaled version of the region of interest.

8. The method of claim 1, wherein a plurality of regions of interest are identified, the plurality of neural networks share a number of common initial layers of neural network processing and the method comprises:

processing each scaled version of a region of interest using the common initial layers of neural network processing; and subsequent to the processing of each scaled version of a region of interest using the common initial layers of neural network processing, processing each scaled version of a region of interest using remaining layers of neural network processing of the neural network selected to be used to process the respective scaled version of a region of interest, the remaining layers of neural network processing not being common to all of the plurality of neural networks.

9. The method of claim 1, wherein the plurality of regions of interest are grouped prior to processing such that all of the scaled versions of the regions of interest that are to be processed by a first neural network of the plurality of neural networks are processed together and all of the scaled versions of the regions of interest that are to be processed by a second neural network of the plurality of neural networks are processed together.

10. The method of claim 1, wherein an output of the processing by the selected neural network is used in performing an asynchronous spacewarp process.

11. A data processing system, the system comprising:

a processing circuit or circuits configured to execute a plurality of neural networks, each neural network operable to process regions of interest identified in a frame to be processed and each configured to more optimally process a region of interest of a respective size, wherein the respective size of a region of interest that can be more optimally processed is different for different ones of the plurality of neural networks that the processing circuit or circuits is configured for executing;

a region identifying circuit configured to identify a plurality of regions of interest for processing within a frame;

a size determining circuit configured to determine a size of a region of interest within a frame;

a neural network selecting circuit configured to select, based on the determined size of a region of interest within a frame, one of the plurality of neural networks to process the region of interest;

a scaling circuit configured to scale a region of interest to produce a scaled version of a region of interest, the scaling determined based on the selected neural network; and a control circuit configured to, for respective ones of the plurality of regions of interest identified for processing by the region identifying circuit:

cause the size determining circuit to determine a size of the region of interest;

cause the neural network selecting circuit to select, based on the determined size of the region of interest within the frame, one of the plurality of neural networks to use to process the region of interest; and cause the scaling circuit to scale the region of interest to produce a scaled version of the region of interest, the scaling determined based on the selected neural network;

the control circuit further configured to:

sort regions of interest identified for processing into groups based on the neural networks selected to process different ones of the regions of interest; and cause the groups to be processed, wherein processing a group comprises processing the scaled versions of the regions of interest in the group using the selected neural network or neural networks for processing the regions of interest in the group, and wherein the control circuit is configured to control the order in which the scaled versions of the regions of interest are allocated for processing based on the groups that the regions of interest are sorted into, such that the data processing system is operable for all of the scaled versions of the regions of interest in a first group to be allocated to be processed before any of the scaled versions of the regions of interest in a second group are allocated to be processed.

12. The system of claim 11, wherein the frame is an image.

13. The system of claim 11, wherein the region identifying circuit is configured to identify a region of interest within a frame by identifying a region of data positions in the frame that have the same or similar values for a property.

14. The system of claim 13, wherein the property is depth.

15. The system of claim 11, wherein the neural network selecting circuit is configured to select the neural network that is optimized for the closest smaller size of region of interest to the determined size of a region of interest to be processed where possible.

16. The system of claim 11, wherein the scaling circuit is configured to change the shape of a region of interest when scaling a region of interest.

17. The system of claim 11, wherein the scaling circuit is configured to pad a scaled version of a region of interest with dummy values in order to change the shape of the scaled version of the region of interest.

18. The system of claim 11, wherein the plurality of neural networks share a number of common initial layers of neural network processing and the control circuit is configured to, when a plurality of regions of interest are to be processed together:

cause each scaled version of the regions of interest to be processed using the common initial layers of neural network processing first; and cause, subsequent to the processing of each scaled version of a region of interest using the common initial layers of neural network processing, each scaled version of a region of interest to be processed using remaining layers of neural network processing of the neural network selected to be used to process the respective scaled version of a region of interest, the remaining layers of neural network processing not being common to all of the plurality of neural networks.

19. The system of claim 11, wherein an output of the processing by the selected neural network is used in performing an asynchronous spacewarp process.

20. A non-transitory computer-readable storage medium storing computer software code that when executing on at least one processor performs a method of operating a data processing system which can execute a plurality of neural networks, each neural network operable to process regions of interest identified in a frame to be processed and each configured to more optimally process a region of interest of a respective size, wherein the respective size of a region of interest that can be more optimally processed is different for different ones of the plurality of neural networks that the data processing system can execute, the method comprising, for a frame to be processed:

identifying a plurality of regions of interest for processing within the frame and, for respective ones of the plurality of regions of interest identified for processing:

determining a size of the region of interest within the frame;

selecting, based on the determined size of the region of interest within the frame, one of the plurality of neural networks to use to process the region of interest; and scaling the region of interest to produce a scaled version of the region of interest, the scaling determined based on the selected neural network;

the method further comprising:

sorting regions of interest identified for processing into groups based on the neural networks selected to process different ones of the regions of interest; and processing the groups, wherein processing a group comprises processing the scaled versions of the regions of interest in the group using the selected neural network or neural networks for processing the regions of interest in the group, and wherein the order in which the scaled versions of the regions of interest are allocated for processing is controlled based on the groups that the regions of interest are sorted into, such that for at least a first group and a second group:

all of the scaled versions of the regions of interest in the first group are allocated to be processed before any of the scaled versions of the regions of interest in the second group are allocated to be processed.

* * * * *